(12) United States Patent
Kamijima

(10) Patent No.: US 7,963,677 B2
(45) Date of Patent: Jun. 21, 2011

(54) LIGHT SOURCE DEVICE, HAVING WAVELENGTH CONVERSION AND SEPARATION MEANS, AND PROJECTOR

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 845 days.

(21) Appl. No.: 11/962,737

(22) Filed: Dec. 21, 2007

(65) Prior Publication Data

US 2008/0159736 A1    Jul. 3, 2008

(30) Foreign Application Priority Data

Dec. 28, 2006 (JP) ................. 2006-353825
Oct. 11, 2007 (JP) ................. 2007-265269

(51) Int. Cl.
*F21V 9/00* (2006.01)
*F21V 33/00* (2006.01)

(52) U.S. Cl. .......... 362/293; 362/84; 362/298; 362/253; 362/305; 313/493; 313/498; 313/501

(58) Field of Classification Search ................. 362/293, 362/84, 298, 305, 253; 313/493, 498, 501
See application file for complete search history.

(56) References Cited

U.S. PATENT DOCUMENTS 5,761,227 A    6/1998   Hargis et al.

FOREIGN PATENT DOCUMENTS

| JP | A 59-128525 | 7/1984 |
|----|-------------|--------|
| JP | A 07-086668 | 3/1995 |

OTHER PUBLICATIONS

U.S. Appl. No. 60/667,201, filed Mar. 30, 2005; Andrei Shchegrov.
U.S. Appl. No. 60/667,202, filed Mar. 30, 2005; Andrei Shchegrov.

*Primary Examiner* — Ismael Negron
(74) *Attorney, Agent, or Firm* — Oliff & Berridge PLC

(57) ABSTRACT

A light source device includes a light source unit emitting light of a first wavelength and a wavelength converting element converting light of the first wavelength into light of a second wavelength. An external resonator transmits light of the second wavelength toward an emission destination and reflects light of the first wavelength to resonate between the light source unit and the external resonator. A wavelength separating section transmits light converted from the first wavelength to the second wavelength while traveling from the external resonator to the light source unit and reflects light of the first wavelength in order to separate the different wavelength light. A turnback section reflects light of the second wavelength separated by the wavelength separating section toward the emission destination. In addition, the wavelength separating section reflects light of the first wavelength from the light source unit to travel toward the wavelength converting element.

20 Claims, 16 Drawing Sheets

LIGHT SOURCE DEVICE, HAVING WAVELENGTH CONVERSION AND SEPARATION MEANS, AND PROJECTOR

BACKGROUND

1. Technical Field

The present invention relates to a light source device, an illuminating device, a monitoring apparatus, and a projector, and more particularly, to a technology of a light source device using a wavelength converting element.

2. Related Art

As a light source device for a monitoring apparatus or a projector, a technology using a laser light source supplying a laser light has been suggested. In comparison with a UHP lamp used in the past as the light source device for a monitoring apparatus or a projector, the laser light source has advantages that color reproducibility is high, instantaneous lighting is possible, and lifetime is long. As the laser light source, a light source directly supplying a basic wavelength light from a light-emitting section and a light source converting and supplying the basic wavelength light in wavelength are known. For example, a second-harmonic generation (SHG) element is used as a wavelength converting element converting the wavelength of the basic wavelength light. By employing the wavelength converting element, it is possible to supply a laser light of a desired wavelength by the use of a general-purpose laser light source which is easily available. It is also possible to supply a laser light with sufficient intensity. It is known that the wavelength conversion efficiency of an incident light incident on the SHG element is about in the range of 30% to 40%. In a configuration allowing the basic wavelength light to be simply incident on the SHG element, the intensity of the harmonic light converted in wavelength by the SHG element is much smaller than the intensity of the basic wavelength light. A technology of supplying a laser light converted in wavelength with high efficiency is disclosed, for example, in JP-A-59-128525. In the technology disclosed in JP-A-59-128525, a basic wavelength light is separated from a light passing through the SHG element and is allowed to be incident on the SHG element again.

In the configuration disclosed in JP-A-59-128525, a complex and great structure is necessary to synthesize the light converted in wavelength by the SHG element and the light converted in wavelength by allowing the basic wavelength light once passing through the SHG element to be incident on the SHG element again. The optical loss increases by allowing lights to be incident on many optical elements. In other configurations suggested in the past such as a configuration in which lights are separated by the use of a switch structure disposed inside a resonator (JP-A-7-86668) and a configuration in which lights are separated by the use of a mirror disposed inside a resonator (U.S. Pat. No. 5,761,227), the same problems as JP-A-59-128525 such as the complication in configuration, the increase in size, and the optical loss are caused. These known configurations have a problem in that it is difficult to obtain high wavelength conversion efficiency with a simple and small configuration.

SUMMARY

An advantage of some aspects of the invention is that it provides a light source device which can obtain high wavelength conversion efficiency with a simple and small configuration, an illuminating device using the light source device, and a monitoring apparatus and a projector using the illuminating device.

According to an aspect of the invention, there is provided a light source device including: a light source unit emitting light of a first wavelength; a wavelength converting element converting the light of the first wavelength into light of a second wavelength different from the first wavelength; an external resonator transmitting the light of the second wavelength emitted from the wavelength converting element to travel to a emission destination and reflecting the light of the first wavelength to resonate between the light source unit and the external resonator; a wavelength separating section transmitting the light converted from the first wavelength to the second wavelength in the course of traveling from the external resonator to the light source unit and reflecting the light of the first wavelength to separate the light of the first wavelength and the light of the second wavelength from each other; and a turnback section turning back the light of the second wavelength separated by the wavelength separating section toward the emission destination. Here, the wavelength separating section reflects the light of the first wavelength from the light source unit to travel toward the wavelength converting element.

The light converted from the first wavelength to the second wavelength in the course of traveling from the light source unit to the external resonator passes through the external resonator. The light of the first wavelength traveling from the light source unit to the external resonator is reflected by the external resonator and is incident on the wavelength converting element. The light converted from the first wavelength to the second wavelength in the course of traveling from the external resonator to the light source unit passes through the wavelength separating section and then is incident on the turnback section. The light of the second wavelength incident on the turnback section is guided toward the emission destination. In this way, the light converted from the first wavelength to the second wavelength in the course of traveling from the light source unit to the external resonator and the light converted from the first wavelength to the second wavelength in the course of traveling from the external resonator to the light source unit are synthesized. By enabling synthesis of the lights with a small number of optical members, it is possible to reduce the optical loss with a simple and small configuration. Thanks to the structure of the resonators it is possible to emit the light of the second wavelength at high wavelength conversion efficiency. Accordingly, it is possible to provide a light source device which can obtain high wavelength conversion efficiency with a simple and small configuration.

The turnback section may have an integrated structure. As a result, it is possible to simplify and reduce in size the light source device.

The turnback section may include an optical element totally reflecting the light of the second wavelength in a boundary surface thereof. It is possible to turn back the light of the second wavelength from the wavelength separating section with a simple configuration using a single optical element.

The light source device may further include a reflecting section that is disposed in the optical element and that reflects the light of the second wavelength. Accordingly, it is possible to turn back the light of the second wavelength from the wavelength separating section.

The optical element may have a first face provided with the wavelength separating section and a second face reflecting the light of the second wavelength passing through the first face. Here, the first face and the second face may be substantially perpendicular to each other. Accordingly, it is possible to embody the configuration for turning back the light of the second wavelength to the emission destination.

The turnback section may allow the light of the second wavelength traveling from the turnback section toward the emission destination to travel substantially parallel to the light of the first wavelength from the light source unit reflected by the wavelength separating section. Accordingly, since the parallel light can be allowed to travel to the emission destination, it is possible to supply a laser light suitable for use in illumination.

The turnback section emits a light from the same face on which the light is incident from the wavelength separating section. Accordingly, since the gap between the light of the second wavelength passing through the external resonator and the light turned back by the turnback section can be decreased, it is possible to embody a configuration more suitable for a decrease in size.

The optical element may have a sectional shape of a square. The optical element having a sectional shape of a square can be easily formed. Accordingly, it is possible to allow the parallel light to travel to the emission destination by means of the configuration which can be easily formed.

The optical element may have a cube shape. Accordingly, it is possible to allow the parallel light to travel to the emission destination and to easily form the optical element.

The optical element may have a sectional shape of a right-angled triangle. The optical element having a sectional shape of a right-angled triangle can be easily formed. In addition, it is possible to allow the parallel light to travel to the emission destination only by the use of the total reflection from the boundary surface. Accordingly, it is possible to allow the parallel light to travel to the emission destination by means of the configuration which can be easily and simply formed.

The turnback section may allow the light of the second wavelength traveling from the turnback section to the emission destination and the light of the second wavelength passing through the external resonator to converge to the emission destination. Accordingly, it is possible to reduce the size of a supply object of the laser light and to reduce the loss of a laser light in the emission destination.

The turnback section may allow the light of the second wavelength traveling from the turnback section to the emission destination and the light of the second wavelength passing through the external resonator to diverge to the emission destination. Accordingly, it is possible to reduce the energy concentration on the supply object.

The turnback section may include a first mirror serving as the wavelength separating section, a second mirror reflecting the light of the second wavelength from the first mirror, and a third mirror reflecting the light of the second wavelength from the second mirror. It is possible to simplify the turnback section including the first mirror, the second mirror, and the third mirror and to reduce the manufacturing cost thereof. Accordingly, it is possible to turn back the light of the second wavelength with a low-cost and simple configuration.

The light source device may further include a fixing section fixing the firsts mirror, the second mirror, and the third mirror. Accordingly, it is possible to integrate the first mirror, the second mirror, and the third mirror into one body.

The light source device may further include an adhesive layer adhering at least one of the first mirror, the second mirror, and the third mirror to the fixing section. Accordingly, it is possible to fix at least one of the first mirror, the second mirror, and the third mirror to the fixing section.

The light source device may further include an elastic structure bringing at least one of the first mirror, the second mirror, and the third mirror into contact with the fixing section. Accordingly, it is possible to fix at least one of the first mirror, the second mirror, and the third mirror to the fixing section.

The wavelength separating section may serve as a first wavelength separating section reflecting a part of the light of the first wavelength from the external resonator and transmitting a part of the light of the first wavelength and the light of the second wavelength. Here, the turnback section may include a second wavelength separating section separating the light of the first wavelength from the first wavelength separating section and the light of the second wavelength from each other. By using the second wavelength separating section, it is possible to reduce the light of the first wavelength emitted from the light source device when the light of the first wavelength passing through the first wavelength separating section exists.

The light source device may further include a light detector detecting the light of the first wavelength separated by the second wavelength separating section. By using the light detector, it is possible to control the output of the light source unit on the basis of the detection result of the light detector. Accordingly, it is possible to effectively utilize the light of the first wavelength separated by the second wavelength separating section.

The light source device may further include a light absorber absorbing the light of the first wavelength separated by the second wavelength separating section. Accordingly, it is possible to reduce the emission of the light of the first wavelength which is an unnecessary light.

According to another aspect of the invention, there is provided an illuminating device including the above-mentioned light source device and illuminating an illuminating object with the light from the light source device. By using the light source device, it is possible to obtain high wavelength conversion efficiency with a simple and small configuration. Accordingly, it is possible to provide an illuminating device which can illuminate an illuminating object with high efficiency with a simple and small configuration.

According to still another aspect of the invention, there is provided a monitoring apparatus including the above-mentioned illuminating device and an image pickup unit picking up an image of a subject illuminated by the illuminating device. By using the illuminating device, it is possible to illuminate an illuminating object with high efficiency with a simple and small configuration. Accordingly, it is possible to provide a monitoring apparatus which can monitor a bright image with a simple and small configuration.

According to still another aspect of the invention, there is provided a projector including the illuminating device and a spatial light modulator modulating a light from the illuminating device on the basis of an image signal. By using the illuminating device, it is possible to illuminate an illuminating object with high efficiency with a simple and small configuration. Accordingly, it is possible to provide a projector which can display a bright image with a simple and small configuration.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the attached drawings.

First Embodiment

Figure 1:
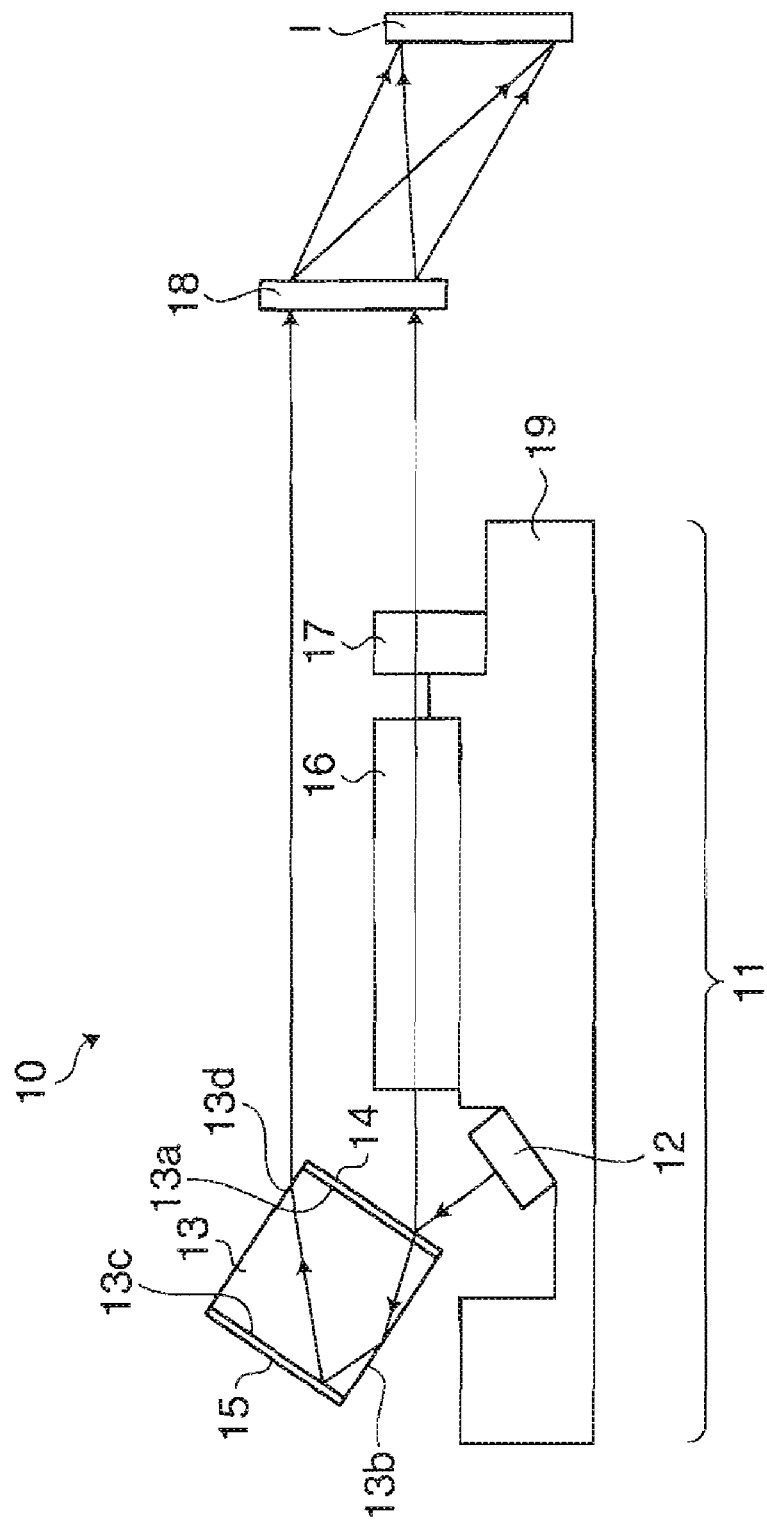
FIG. 1 is a diagram schematically illustrating a configuration of an illuminating device according to a first embodiment of the invention.

FIG. 1 is a diagram schematically illustrating a configuration of an illuminating device 10 according to a first embodiment of the invention. The illuminating device 10 includes a light source device and a diffusion element 18. The light source device 11 includes a semiconductor element 12, an optical prism 13, an SHG element 16, and an external resonator 17 which are disposed on a substrate 19. The semiconductor element 12 serves as a light source unit emitting a basic light of a first wavelength. The first wavelength is, for example, 1064 nm.

Figure 2:
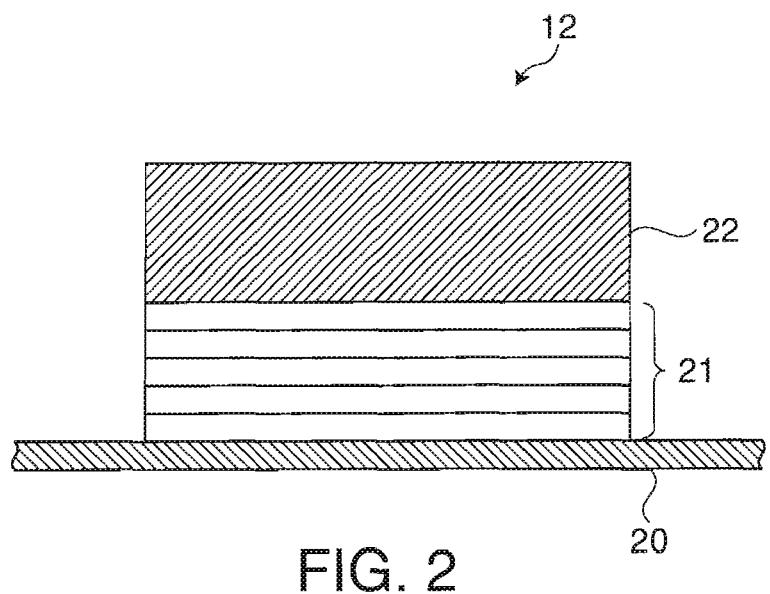
FIG. 2 is a diagram schematically illustrating a sectional shape of a semiconductor element.

FIG. 2 is a diagram schematically illustrating a sectional configuration of the semiconductor element 12. The semiconductor element 12 is a so-called surface-emitting semiconductor element and has a substrate 20 formed of a semiconductor wafer, a mirror layer 21 that is formed on the substrate 20 to have a function of a reflecting mirror, and a laser medium 22 formed on the mirror layer 21.

The mirror layer 21 is formed on the substrate 20 with a laminated structure of a high refractive-index derivative and a low refractive-index derivative formed by a CVD (Chemical Vapor Deposition) method. The thickness of the constituent layers, the materials of the constituent layers, and the number of layers constituting the mirror layer 21 are optimized for the wavelength (first wavelength) of the basic light emitted from the semiconductor element 12 and are set to such conditions to reinforce each other by means of interference with reflected lights.

The laser medium 22 is formed on the mirror layer 21. The laser medium 22 is connected to a current supply section not shown. When a predetermined amount of current is supplied from the current supply section, the laser medium 22 emits a light of a predetermined wavelength. The laser medium 22 amplifies the light of the first wavelength by allowing the light of the first wavelength to resonate between the external resonator 17 shovel in FIG. 1 and the mirror layer 21. The light reflected by the mirror layer 21 and the external resonator 17 is amplified by means of resonance with a light emitted newly from the laser medium 22. The light of the first wavelength is emitted from an emission surface of the laser medium 22 in a direction substantially perpendicular to the mirror layer 21 of the substrate 20.

Referring to FIG. 1 again, the SHG element 16 is a wavelength converting element converting the light of the first wavelength into a light of a second wavelength different from the first wavelength. The second wavelength is substantially a half of the first wavelength, for example, 532 nm.

Figure 3:
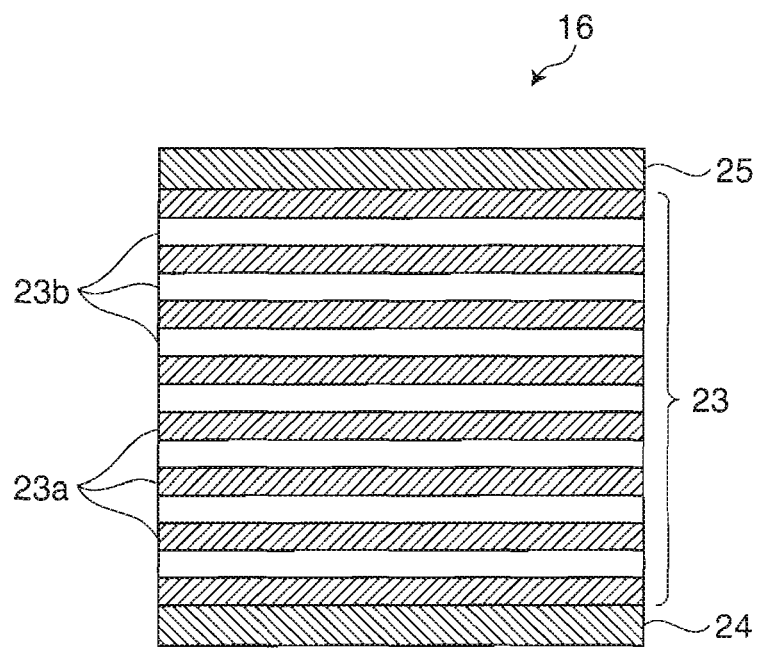
FIG. 3 is a diagram schematically illustrating a sectional shape of an SHG element.

FIG. 3 is a diagram schematically illustrating a sectional shape of the SHG element 16. The SHG element 16 has, for example, a square pillar shape. The SHG element 16 includes a wavelength converting section 23 and two anti-reflective (AR) films. One AR film 24 is formed on a surface of the wavelength converting section 23 facing the semiconductor element 12. The other AR film 25 is formed on a surface of the wavelength converting section 23 facing the external resonator 17.

The wavelength converting section 23 has a periodic polarization inverted structure and converts a light of a first wavelength into a light of a second wavelength by means of a wavelength conversion process using quasi phase matching (QPM). However, the wavelength conversion efficiency of the wavelength converting section 23 is generally in the range of 30% to 40%. That is, the whole light of the first wavelength emitted from the semiconductor element 12 is not converted into the light of the second wavelength.

The periodic polarization-inverted structure is formed inside the crystalline substrate made of an inorganic nonlinear optical material such as lithium niobate $LiNbO_3$; LN) or lithium tantalite ($LiTaO_3$; LT). Specifically, in the periodic polarization-inverted structure, two areas 23a and 23b having inverted polarized directions are alternately arranged with a predetermined pitch in a direction substantially perpendicular to the light emitted from the semiconductor element 12. The pitch between the areas 23a and 23b is properly determined in consideration of the wavelength of the incident light and the refractive index distribution of the crystalline substrate.

In general, the light emitted from the semiconductor element 12 oscillates in plural longitudinal modes of a gain band and varies in wavelength due to a variation in temperature. That is, the allowable range of wavelength of the light converted by the SHG element 16 is about 0.3 nm and varies at 0.1 nm/° C. with the variation in temperature of the environment.

The AR films 24 and 25 are dielectric films including a single layer or multiple layers and transmit a light of the first wavelength and a light of the second wavelength, for example, with the permeability of 98% or more. The AR films 24 and 25 are not necessary for accomplishing the function of the SHG element 16 and thus may be omitted. That is, the SHG element 16 may include only the wavelength converting section 23.

Referring to FIG. 1 again, the external resonator 17 has a function of selectively reflecting the light of the first wavelength and transmitting lights of wavelengths (including the second wavelength) other than the first wavelength. The external resonator 17 transmits the light of the second wavelength emitted from the SHG element 16 to travel toward the diffusion element 18 as an emission destination and reflects the light of the first wavelength to resonate between the semiconductor element 12 and the external resonator. The external resonator 17 also has a function of narrowing the wavelength band of the light to be amplified by selectively reflecting the light of the first wavelength.

Figure 4:
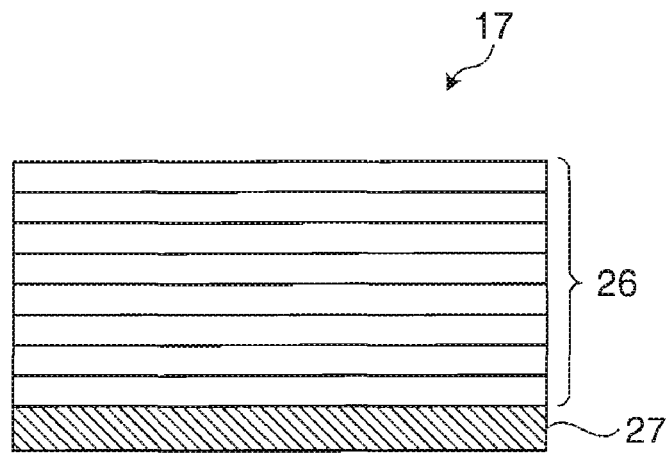
FIG. 4 is a schematically illustrating a sectional shape of an external resonator.

FIG. 4 is a cross-sectional view schematically illustrating a configuration of the external resonator 17. The external resonator 17 has a square prism shape, similarly to the SHG element 16. A bragg grating section 26 is a volume phase grating in which a bragg grating structure is formed. An AR film 27 is disposed on an incident face of the bragg grating section 26.

The bragg grating section 26 includes plural layers laminated along an optical path. In the bragg grating section 26, an ultra violet light of a predetermined wavelength is applied to a glass layer made of alkali boroalumino silicate glass including $SiO_2$ as a main component to form an interference pattern having a different refractive index in the glass layer in the form of a layer. The bragg grating section 26 results in the function of the external resonator 17.

The AR film 27 is a dielectric film having a single layer or multiple layers and serves to transmit a light of the first wavelength and a light of the second wavelength, for example, with the permeability of 98% or more. The AR film 27 may be formed on the outgoing surface as well as the incident surface of the bragg grating section 26. The AR film 27 is not necessary for accomplishing the function of the external resonator 17 and thus may be omitted. That is, the external resonator 17 may include only the bragg grating section 26.

Figure 5:
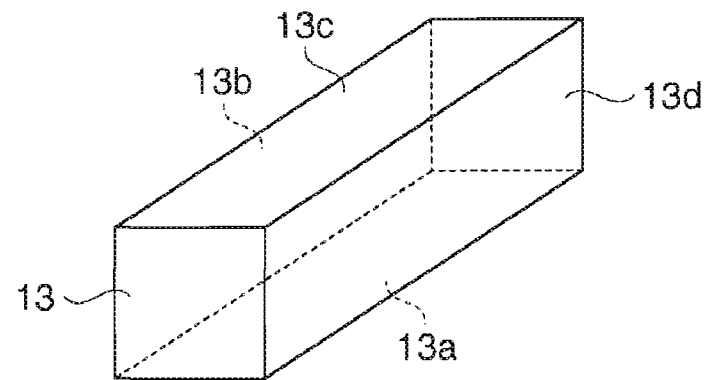
FIG. 5 is a perspective view illustrating an optical prism.

FIG. 5 is a perspective view of the optical prism 13. The optical prism 13 is an optical element made of a transparent member such as optical glass of BK7 or the like. The optical prism 13 is formed in the form of a square pillar having a square sectional shape. As shown in FIG. 1, a first face 13*a* of the optical prism 13 is directed to the semiconductor element 12 and the SHG element 16. A wavelength separating film 14 is formed on the first face 13*a*.

A second face 13*b* is a face adjacent to the first face 13*a* and is perpendicular to the first face 13*a*. The optical prism 13 totally reflects a laser light of the second wavelength from the second face 13*b* as a boundary surface. A third face 13*c* is a face parallel to the first face 13*a* and faces the first face 13*a*.

A reflecting film 15 is formed on the third face 13*c*. The optical prism 13 constitutes a turnback section turning back the laser light of the second wavelength separated by the wavelength separating film 14 toward the diffusion element 18. The turnback section has an integrated structure of the single optical prism 13. By using the turnback section having the integrated structure, it is possible to simplify and reduce the light source device 11 in size in comparison with a case where the turnback section includes plural members. In addition, the position adjustment of constituent elements of the turnback section is not necessary and the turnback section can be easily aligned with the other elements.

The wavelength separating film 14 serves as a wavelength separating section separating a light of the first wavelength and a light of the second wavelength from each other by transmitting the light of the second wavelength and reflecting the light of the first wavelength. The wavelength separating film 14 is formed of, for example, a multi-layered dielectric film. The multi-layered dielectric film can be formed by the use of, for example, the CVD method and the thickness of the constituent layers thereof, the materials of the constituent layers, and the number of constituent layers can be optimized depending on required characteristics. The reflecting film 15 serves as a reflecting section reflecting the laser light of the second wavelength. The reflecting film 15 is formed of a high-reflective member such as a multi-layered dielectric film and a metal film. The light source device 11 may be a diode pumped solid state (DPSS) laser or may include a solid-state laser, a liquid-state laser, or a gas-state laser.

The diffusion element 18 serves to shape and enlarge an illuminating area to correspond to an illuminating object I and to uniformize the intensity distribution of the laser light. For example, a computer generated hologram (CGH) as a diffractive optical element can be used as the diffusion element 18. The illuminating object I is disposed at a position on which a high-order diffracted light such as a first-order diffracted light and a second-order diffracted light from the diffusion element 18 is incident and at a position other than the position on which a zero-order diffracted light is incident.

The illuminating device 10 employs an off axis optical system supplying an illuminating light to an illuminating object I in a direction other than the optical axis direction of the illuminating device 10. Accordingly, when the intensity of the zero-order diffracted light is greater than the other diffracted light, it is possible to prevent only a part of the illuminating object I from being brightened, thereby obtaining an illuminating light having an excellent intensity distribution. The diffusion element 18 may diffract the incident light by reflecting the incident light, as well as may diffract the incident light by transmitting the incident light. When the intensity distribution of the illuminating object I is excellent, the zero-order diffracted light from the diffusion element 18 may be incident on the illuminating object I.

The light of the first wavelength from the semiconductor element 12 is incident on the wavelength separating film 14. The wavelength separating film 14 reflects the light of the first wavelength from the semiconductor element 12 to travel toward the SHG element 16. The light passing through the SHG element 16 is incident on the external resonator 17. The light converted from the first wavelength to the second wavelength by the SHG element 16 passes through the external resonator 17 and then is incident on the diffusion element 18.

The light of the first wavelength from the SHG element 16 is reflected by the external resonator 17 and then is incident on the SHG element 16. The light converted from the first wavelength no the second wavelength by the SHG element 16 in the course of traveling from the external resonator 17 to the semiconductor element 12 passes through the wavelength separating film 14. The laser light of the second wavelength passing through the wavelength separating film 14 is incident on the optical prism 13 from the first face 13a. The optical prism 13 can prevent the laser light of the second wavelength from being reflected from the first face 13a by properly setting the incident angle of the laser light on the first face 13a.

The laser light of the second wavelength passing through the first face 13a is incident on the second face 13b. The laser light incident on the second face 13b is totally reflected by the second face 13b and travels to the third face 13c. The laser light incident on the third face 13c is reflected by the reflecting film 13 and travels to a fourth face 13d. The laser light incident on the fourth face 13d is emitted from the fourth face 13d of the optical prism 13 and travels to the diffusion element 18. The optical prism 13 turns back the laser light of the second wavelength separated by the wavelength separating film 14 to the diffusion element 18. In this way, the laser light converted from the first wavelength to the second wavelength in the course of traveling from the semiconductor element 12 to the external resonator 17 and the laser light converted from the first wavelength to the second wavelength in the course of traveling from the external resonator 17 to the semiconductor element 12 are synthesized. By making the first face 13a and the second face 13b perpendicular to each other, it is possible to obtain a configuration for turning back the laser light of the second wavelength to the diffusion element 18.

The light of the first wavelength incident on the wavelength separating film 14 from the SHG element 16 is reflected by the wavelength separating film 14 and travels to the semiconductor element 12. The light of the first wavelength incident on the semiconductor element 12 is reflected by the semiconductor element 12. The light of the first wavelength reflected by the semiconductor element 12 travels to the wavelength separating film 14 along with the light of the first wavelength emitted from the semiconductor element 12. By using the resonator structure, it is possible to emit the laser light of the second wavelength with high wavelength conversion efficiency.

By reflecting the laser light by the use of the second face 13b and the third face 13c of the optical prism 13, the laser light of the second wavelength traveling from the optical prism 13 to the diffusion element 18 and the laser light of the first wavelength from the semiconductor element 12 reflected by the wavelength separating film 14 travel substantially parallel to each other. By using the optical prism 13 having a square pillar, it is possible to supply parallel lights to the diffusion element 18. By supplying the parallel lights to the diffusion element 18, it is possible to a laser light suitable for illumination. For example, the light from the diffusion element 18 can be easily made parallel by the use of a lens and the like and thus it is possible to efficiently use the light by the use of a small-sized optical element.

By using the wavelength separating film 14 disposed on the first face 13a, it is possible to allow the light of the first wavelength emitted from the semiconductor element 12 to travel to the SHG element 16 and to separate the light of the first wavelength and the light of the second wavelength from the SHG element 16. Since the semiconductor element 12 and the SHG element 16 can be disposed with a small gap, it is possible to secure a long space for the SHG element 16. Since the SHG element 16 having a sufficient length can be disposed, it is possible to secure the high wavelength conversion efficiency by the use of the SHG element 16.

The light source device 11 can synthesize the laser lights with a simple and small configuration in which the wavelength separating film 14 and the reflecting film 15 are disposed in the single optical prism 13. By designing the shape of the optical prism 13 as a square pillar, it is possible to easily form the optical prism. By using the small-sized optical member, it is also possible to reduce the loss of the laser light due to the optical member. Accordingly, it is possible to obtain the high wavelength conversion efficiency with a simple and small configuration.

By disposing the turnback section, which does not complete the resonance of the light of the first wavelength, outside the resonator structure, it is possible to reduce the loss of the light of the first wavelength due to the boundary reflection in the resonator structure. Accordingly, it is possible to efficiently oscillate the laser light. When a configuration for turning back the light of the second wavelength is disposed in the resonator structure, configurations for adjusting both the lights of the first wavelength and the second wavelength are necessary for the inside of the resonator structure. On the contrary, by disposing the turnback section outside the resonator structure, only a configuration for coping with the first wavelength is necessary for the inside of the resonator structure. Accordingly, in the resonator structure, it is possible to reduce the number of layers of the multi-layered dielectric film, to enhance the yield, and to reduce the cost. As a result, it is possible to efficiently oscillate a laser light and to decrease the size and cost of the light source device 11.

Figure 6:
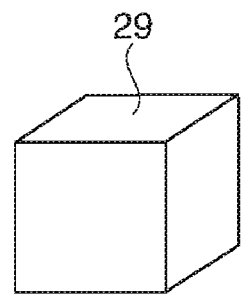
FIG. 6 is a diagram illustrating an optical prism having a cube shape.

An optical prism 29 having a regular hexahedron shape shoe in FIG. 6 may be used as the optical element which is the turnback section. The optical prism 29 can allow the substantially parallel laser light to travel to the emission destination, similarly to the optical prism 13 (see FIG. 5). Similarly to a corner cube, the optical prism 29 can embody the configuration for emitting a laser light substantially in the same direction as the laser light incident on the optical prism 29 by means of the arrangement having a relatively high degree of freedom. By designing the optical prism as a regular hexahedron shape, it is possible to easily form the optical prism 29. The optical prism may be formed in a shape other than the square pillar having a sectional shape of a square. For example, a rectangular hexahedron shape having a rectangular sectional shape may be used. As described later, polygonal prisms other than the square pillar may be used.

Figure 7:
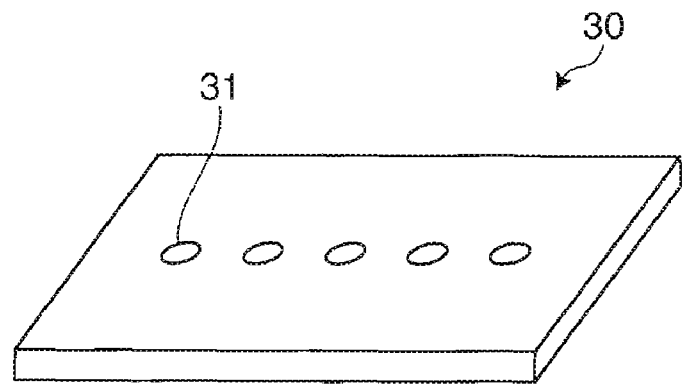
FIG. 7 is a diagram illustrating a semiconductor element having plural light-emitting portions arranged in a line.
Figure 8:
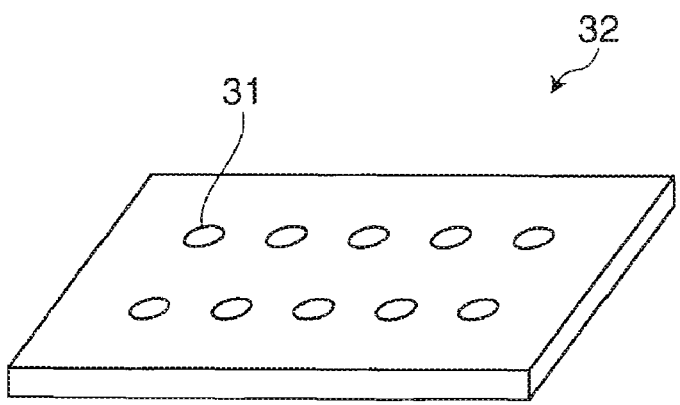
FIG. 8 is a diagram illustrating a semiconductor element having plural light-emitting portions arranged in two lines.

The light source unit may include plural light-emitting portions which are arrayed. For example, a semiconductor element 30 shown in FIG. 7 has plural light-emitting portions 31 arranged in a line. A semiconductor element 32 shown in FIG. 8 has plural light-emitting portions 31 arranged in two lines. The number or lines of the light-emitting portions 31 are not limited to those shown in the figures. When the light source unit having arrayed plural light-emitting portions is used, the configurations of the optical prism 13, the wavelength separating film 14 the reflecting film 15, the SHG element 16, and the external resonator 17 can be expanded to correspond to the light source unit. Even by using the configuration including the plural light-emitting portions which are arrayed, it is possible to simply the configuration without causing an excessive increase of the device in size. It is possible to supply a laser light having a constant polarizing direction with stable power and high light utilization efficiency and to allow the increase in intensity due to the array to efficiently result in an increase in output of the light source device.

For example, a third-harmonic generation element may be used as the wavelength converting element, instead of the SHG element 16. In addition to the LN or LT, an inorganic nonlinear optical material such as $KNbO_3$, $Ba_2NaNb_5O_{15}$ (BNN), $KTiOPO_4$ (KTP), $KTiOAsO_4$ (KTA), $\beta\text{-}BaB_2O_4$ (BBO), $LiB_3O_7$ (LEO) may be used as the nonlinear optical material constituting the wavelength converting element. A low-molecular organic material such as meth nitroaniline, 2-methyl-4-nitroaniline, chalcone, dicyanovinyl anisole, 3,5-dimethyl-1-(4-nitrophenyl)pyrazole, and N-methoxymethyl-4-nitroaniline or an organic nonlinear optical material such as a poled polymer may be used. In addition to the volume phase grating, a crystalline volume hologram, a photopolymer volume hologram, or a blazed diffraction grating (a diffraction grating having a sawteeth-like sectional shape of a groove) may be used as the external resonator 17.

Figure 9:
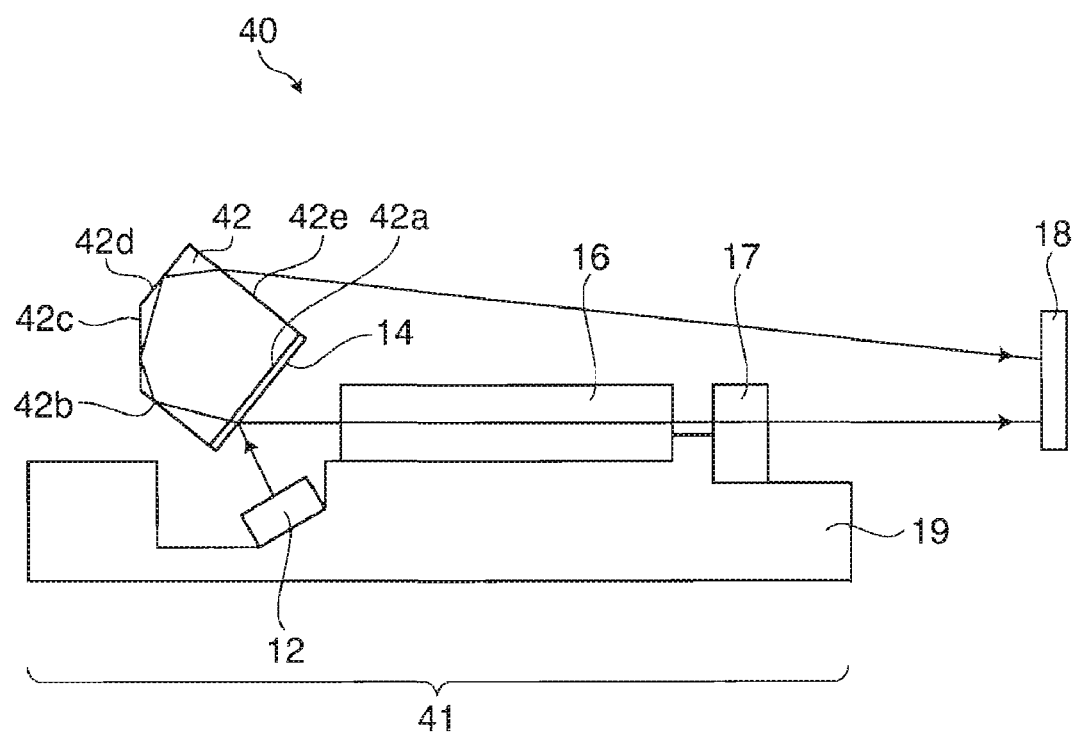
FIG. 9 is a diagram schematically illustrating a configuration of an illuminating device according to a first modified example 1 of the first embodiment.
Figure 10:
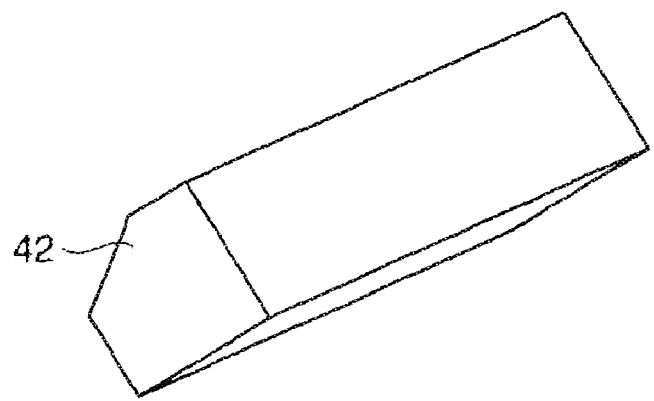
FIG. 10 is a perspective view illustrating an optical prism.

FIG. 9 is a diagram schematically illustrating an illuminating device 40 according to a first modified example of the first embodiment. A light source device 41 of the illuminating device 40 includes an optical prism 42 having a pentagonal sectional shape. The optical prism 42 has a pentagonal prism shape as shown in FIG. 10. The optical prism 42 includes 5 faces 42a to 42e corresponding to the sides of the pentagonal shape shove in FIG. 11. As shown in FIG. 9, the wavelength separating film 14 is disposed on the first face 42a. The optical prism 42 is an optical element totally reflecting a laser light of the second wavelength from three faces 42b, 42c, and 42d as boundary surfaces.

Figure 11:
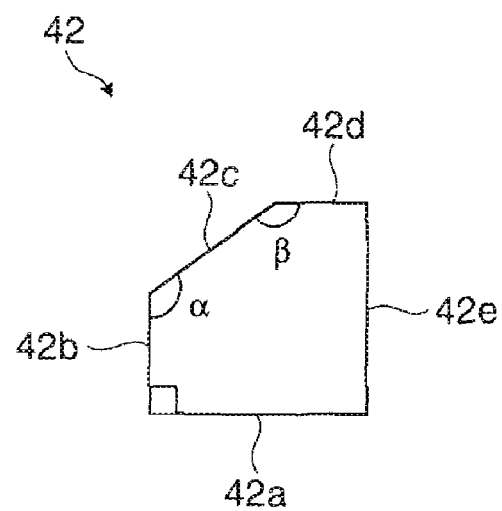
FIG. 11 is a plan view illustrating the optical prism.

The laser light of the second wavelength passing through the first face 42a is totally reflected by the second face 42b, the third face 42c, and the fourth face 42d and then passes through the fifth face 42e. By turning back the laser light by the use of the total reflection using the boundary surface, it is possible to reduce the loss of the laser light in comparison with a case using a reflecting section. The laser light of the second wavelength traveling from the optical prism 42 to the diffusion element 18 and the laser light of the second wavelength passing through the external resonator 17 converge toward the diffusion element 18. As shown in FIG. 11, the first face 42a and the second face 42b are substantially perpendicular to each other. An angle α between the second face 42b and the third face 42c and an angle β between the third face 42c and the fourth face 42d satisfy a relation of α<β.

Thanks to this configuration, it is possible to allow the laser light of the second wavelength from the optical prism 42 and the laser light of the second wavelength passing through the external resonator 17 to converge. By allowing the laser lights to converge toward the diffusion element 18, it is possible to reduce the size of the diffusion element 18 and to reduce the loss of the laser lights in the diffusion element 18. The optical prism may have other polygonal prism shapes having a first face and a second face substantially perpendicular to each other.

Figure 12:
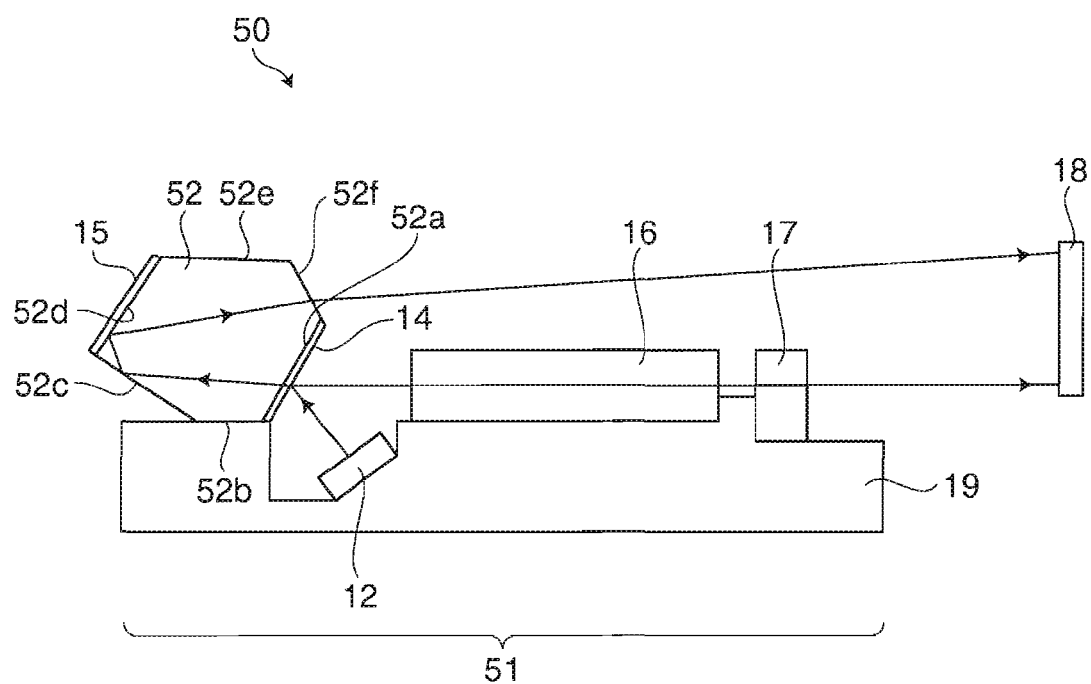
FIG. 12 is a diagram schematically illustrating a configuration of an illuminating device according to a second modified example of the first embodiment.
Figure 13:
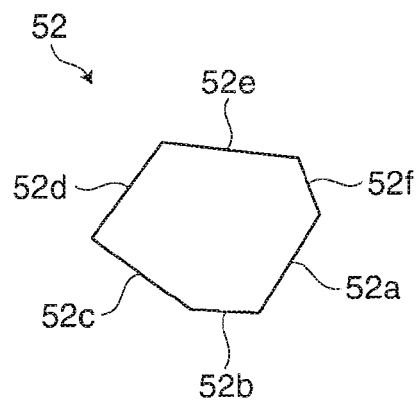
FIG. 13 is a plan view illustrating an optical prism.

FIG. 12 is a diagram schematically illustrating an illuminating device 50 according to a second modified example of the first embodiment. A light source device 51 of the illuminating device 50 includes an optical prism 52 having a hexagonal sectional shape. The optical prism 52 has a hexagonal prism shape. The optical prism 52 has 6 faces 52a to 52f corresponding to the sides of the hexagonal shape shown in FIG. 13. As shown in FIG. 12, the wavelength separating film 14 is formed on the first face 52a. The optical prism 52 is supported in a state where a bottom face 52b adjacent to the first face 52a is disposed on the substrate 19.

The second face 52c adjacent to the bottom face 52b totally reflects the laser light from the first face 52a. The optical prism 52 is an optical element totally reflecting the laser light of the second wavelength from the second face 52c as the boundary surface. The first face 52a and the second face 52c may be substantially perpendicular to each other or may be not perpendicular to each other. The laser light of the second wavelength passing through the first face 52a is totally reflected by the second face 52c and then travels to the third face 52d adjacent to the second face 52c. A reflecting film 15 is formed on the third face 52d. The laser light incident on the third face 52d is reflected by the reflecting film 15 and then travels to the fourth face 52f. The fourth face 52f is a face apart by one face 52e from the third face 52d and is adjacent to the first face 52a. The laser light traveling to the fourth face 52f is emitted externally from the fourth face 52f of the optical prism 52. The laser light of the second wavelength emitted from the optical prism 52 travels to the diffusion element 18.

Figure 14:
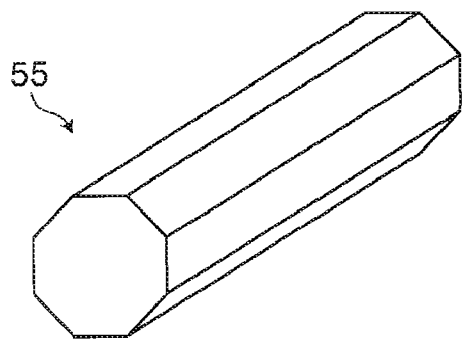
FIG. 14 is a diagram illustrating an optical prism having an octagonal prism shape.

The laser light of the second wavelength traveling to the diffusion element 18 from the optical prism 52 and the laser light of the second wavelength passing through the external resonator 17 are diffused toward the diffusion element 18. Accordingly, it is possible to reduce energy concentration on the diffusion element 18 as an emission destination. Since the optical prism 52 can be disposed by the use of the bottom face 52b, it is possible to easily provide the optical prism 52. In this way, the optical prism may have a configuration other than the configuration in which the first face and the second face substantially perpendicular to each other are adjacent to each other. An optical prism 55 having an octagonal prism shape having a regular octagonal section shown in FIG. 14 may be used as the optical prism. In case of the optical prism 55 having the octagonal prism shape, the optical prism 55 can be easily disposed using a flat face as a bottom face. The optical prism may have a shape other than the shapes described in this embodiment.

Second Embodiment

Figure 15:
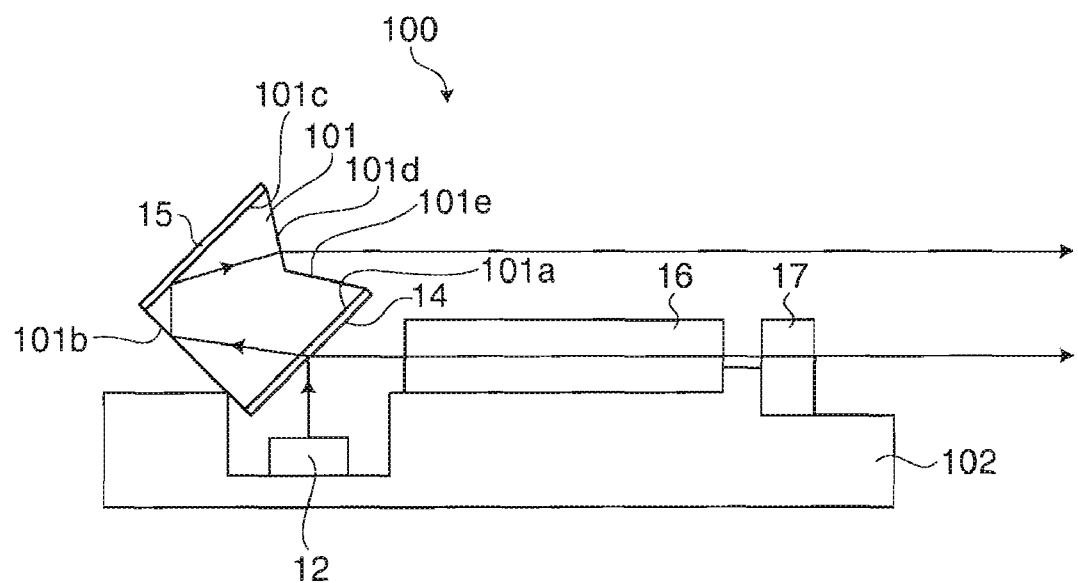
FIG. 15 is a diagram schematically illustrating a configuration of a light source device according to a second embodiment of the invention.

FIG. 15 is a diagram schematically illustrating a configuration of a light source device 100 used in an illuminating device according to a second embodiment of the invention. The light source device 100 includes an optical prim 101 having a pentagonal section. In the section of the optical prism 101, a fourth face 111d and a fifth face 101e form an obtuse angle. The same elements as the above-mentioned embodiment are denoted by the same reference numerals and repeated description thereof is omitted. In the above-mentioned embodiment, the semiconductor element 12 is disposed to be tilted about the face of the substrate 19 provided with the SHG element 16 or the face provided with the external resonator 17. On the contrary, in the second embodiment, a substrate 102 in which the semiconductor element 12 is disposed not to be tilted about the face provided with the SHG element 16 or the face provided with the external resonator 17 is used.

The optical prism 101 as an optical element has a pentagonal prism shape obtained by removing a triangular prism shape having a fourth face 101d and a fifth face 101e from a square prism having a first face 101a, a second face 101b, and a third face 101c. A wavelength separating film 14 is formed on the first face 101a. The second face 101b is a face adjacent to the first face 101a. The optical prism 101 totally reflects the laser light of the second wavelength from the second face 101b which is an interface. The third face 101c is a face adjacent to the second face 101b and faces the first face 101a. A reflecting film 15 is formed on the third face 101c. The fourth face 101d is a face adjacent to the third face 101c. The fifth face 101e is a face between the fourth face 101d and the first face 101a. The optical prism 101 constitutes a turnback section turning back the laser light of the second wavelength separated by the wavelength separating film 14.

The light of the first wavelength that is incident on the wavelength separating film 14 from the semiconductor element 12 and reflected by the wavelength separating film 14 is bent in optical path by about 90 degrees by the wavelength separating film 14 and travels to the SHG element 16. The light of the first wavelength that is incident on the wavelength separating film 14 from the SHG element 16 and reflected by the wavelength separating film 14 is bent in optical path by about 90 degrees by the wavelength separating film 14 and travels to the semiconductor element 12.

The laser light of the second wavelength taken out of the resonator structure by passing through the wavelength separating film 14 is incident on the optical prism 101 from the first face 101a. The laser light of the second wavelength is refracted by the first face 101a. The laser light of the second wavelength from the first face 101a is incident on the second face 101b. The laser light of the second wavelength totally reflected by the second face 101b is incident on the reflecting film 15. The laser light of the second wavelength reflected by the reflecting film 15 is incident on the fourth face 101d. The laser light of the second wavelength is refracted by the fourth face 101d. The laser light of the second wavelength taken out of the optical prism 101 from the fourth face 101d travels substantially parallel to the laser light of the first wavelength reflected by the wavelength separating film 14.

The optical prism 101 can be relatively easily formed by cutting out a part of a transparent member having a square pillar shape. In this embodiment, it is possible to allow a parallel light to travel to an emission destination with the configuration which can be easily formed. By employing the configuration allowing a parallel light to travel to the emission destination, it is possible to easily adjust an illuminating optical system fitted with the light source device 100. By properly modifying the light source device 100 according to this embodiment, a converging light or a diverging light may be allowed to travel to the emission destination.

Third Embodiment

Figure 16:
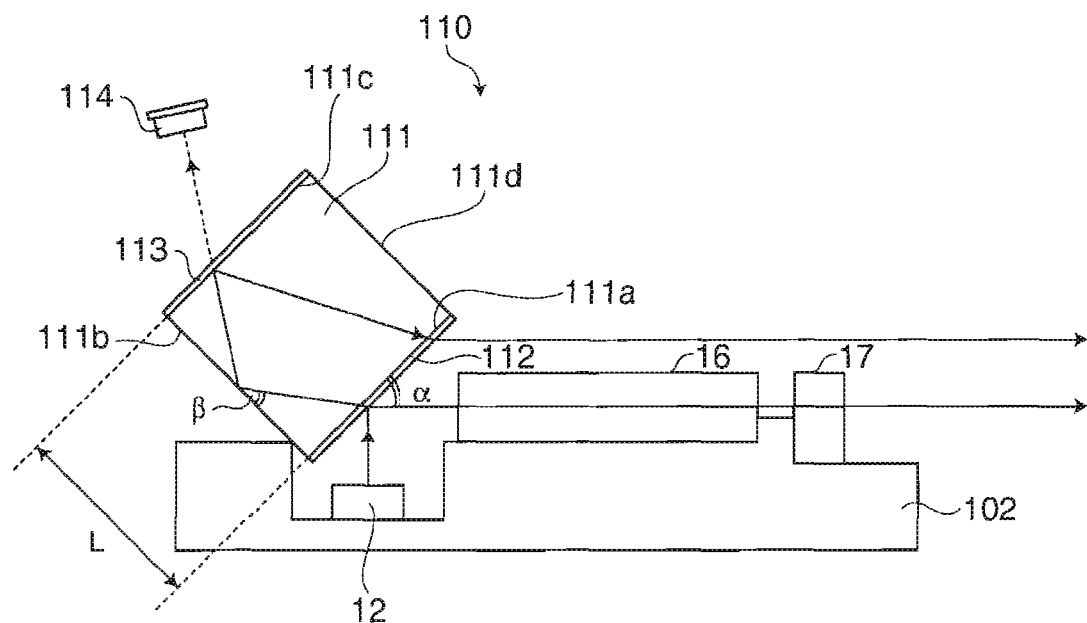
FIG. 16 is a diagram schematically illustrating a configuration of a light source device according to a third embodiment of the invention.

FIG. 16 is a diagram schematically illustrating a configuration of a light source device 110 used in an illuminating device according to a third embodiment of the invention. The light source device 110 includes an optical prism 111 having a square-shaped section. The same elements as the abovementioned embodiments are denoted by the same reference numerals and repeated description thereof is omitted. A first wavelength separating film 112 as a first wavelength separating section is formed on a first face 111a of the optical prism 111 as an optical element. The first wavelength separating film 112 serves as a wavelength separating section reflecting a part of the light of the first wavelength from the external resonator 17 and transmitting a part of the light of the first wavelength and the light of the second wavelength.

A second face 111b is a face adjacent to the first face 111a and is perpendicular to the first face 111a. A third face 111c is a face adjacent to the second face 111b and is parallel to the first face 111a. A second wavelength separating film 113 as a second wavelength separating section is formed on a third face 111c. The second wavelength separating film 113 separates the light of the first wavelength and the light of the second wavelength from the first wavelength separating film 112 by transmitting the light of the first wavelength and reflecting the light of the second wavelength. A fourth face 111d is a face between the third face 111c and the first face 111a and is parallel to the second face 111b. The optical prism 111 constitutes a turnback section turning back the laser light of the second wavelength separated by the first wavelength separating film 112. One side L of the section of the optical prism 111 is, for example, 3 mm. The refractive index of the optical prism 111 is, for example, 1.52.

The light from the semiconductor element 12 is incident on the first face 111a at an angle of about 45 degrees. The angle α formed by the light from the SHG element 16 and the first face 111a is about 45 degrees. The laser light of the second wavelength and the light of the first wavelength taken out of the resonator structure by passing through the first wavelength separating film 112 are incident on the optical prism 111 through the first face 111a. The light incident on the first face 111a is refracted by the first face 111a. The light from the first face 111a is incident on the second face 111b. The angle β formed by the light incident on the second face 111b and the second face 111b is about 27.5 degrees. The light totally reflected by the second face 111b is incident on the second wavelength separating film 113.

The light of the first wavelength incident on the second wavelength separating film 113 passes through the second wavelength separating film 113. The light of the first wavelength passing through the second wavelength separating film 113 is taken out of the optical prism 111 from the third face 111c and is then incident on the light detector 114. The light detector 114 detects the light of the first wavelength separated by the second wavelength separating film 113. For example, a photodiode can be used as the light detector 114. The semiconductor element 12 emits a light having intensity controlled on the basis of the detection result of the light detector 114. By employing the light detector 114, it is possible to perform a feedback control operation on the output of the semiconductor element 12.

The laser light of the second wavelength reflected by the second wavelength separating film 113 is incident on the first face 111a. The optical prism 111 as the turnback section emits the light from the first face 111a which is the same face as the face on which the light from the first wavelength separating film 112 is incident. The laser light of the second wavelength incident on the first face 111a is refracted by the first face 111a. The light taken out of the optical prism 111 from the first face 111a passes through the first wavelength separating film 112. The laser light of the second wavelength passing through the first wavelength separating film 112 travels substantially parallel to the light of the first wavelength reflected by the first wavelength separating film 112.

The optical prism 111 having a square-shaped section can be easily formed. Since the optical prism 111 can be easily formed, it is possible to reduce deviations in angle of the lights or individual differences in gap between the lights. Accordingly, the light source device 110 can be easily fitted to the illuminating optical system and the illuminating optical system fitted with the light source device 110 can provide stable optical performance. The optical prism 111 having a rectangular shape can be easily formed by the use of a depositing apparatus at the time of forming the wavelength separating film or the reflecting film, thereby forming a stable film.

In this embodiment, by employing the optical prism 111 having a small-sized section shape with one side L of 3 mm, the first face 111a can be used for both the incidence of the light on the optical prism 111 and the emission of the laser light from the optical prism 111. By enabling the incidence and the emission of the light using the same first face 111a of the optical prism 111, it is possible to narrow the gap between the laser light of the second wavelength passing through the external resonator 17 and the laser light of the second wavelength emitted from the optical prism 111. By enabling the emission of the laser lights with the narrow gap, it is possible to reduce in size of the diffusion element 18 (see FIG. 1) and the elements of the optical system. Accordingly, it is possible to obtain a configuration further suitable for a decrease in size.

By using the second wavelength separating film 113 disposed on the optical prism 111 as the turnback section, it is possible to reduce the light of the first wavelength emitted from the light source device 110, when the light of the first wavelength passing through. In the first wavelength separating film 112. By allowing the light detector 114 to detect the light of the first wavelength passing through the second wavelength separating film 113 it is possible to effectively use the light of the first wavelength separated by the second wavelength separating film 113. In the light source devices according to the above-mentioned embodiments, the second wavelength separating film 113 may be provided to the turnback section. For example, in the light source device 100 shove in FIG. 15. The second wavelength separating film 113 may be provided instead of the reflecting film 15. The light source device 110 according to this embodiment may include the reflecting film 15 instead of the second wavelength separating film 113.

Figure 17:
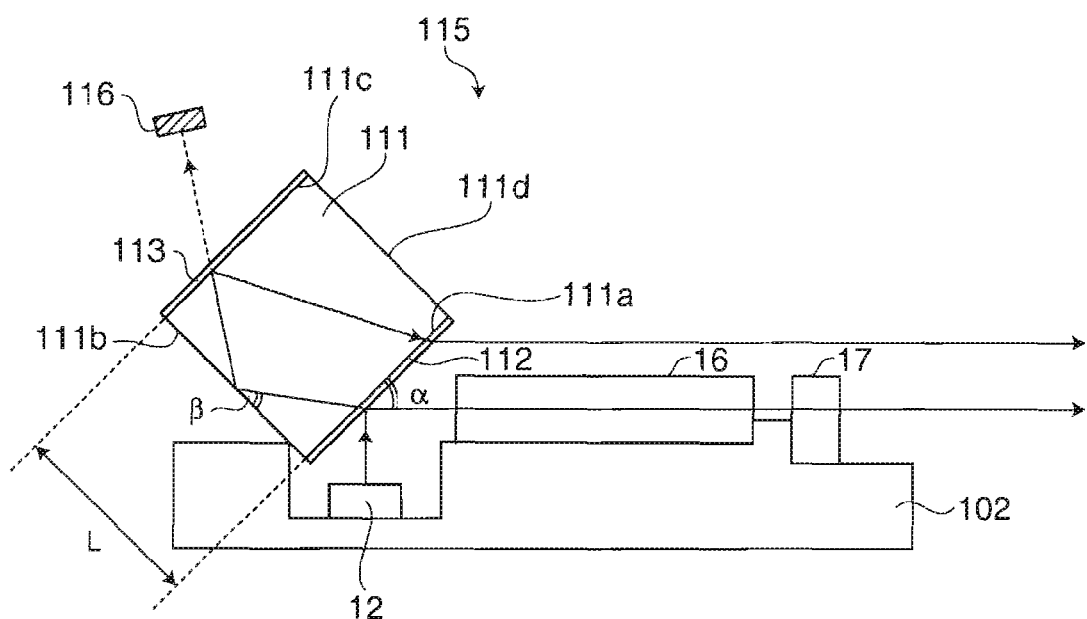
FIG. 17 is a diagram schematically illustrating a configuration of a light source device according to a modified example of the third embodiment of the invention.

FIG. 17 is a diagram schematically illustrating a light source device 115 according to a modified example of this embodiment. The light source device 115 includes a light absorber 116 provided instead of the light detector 114. The light absorber 116 absorbs the light of the first wavelength separated by the second wavelength separating film 113. The light absorber 116 can be formed of, for example, a light-absorbing resin. In this case, it is possible to reduce the emission of the light of the first wavelength which is an unnecessary light. For example, the illuminating device or an apparatus mounted with the illuminating device may be allowed to serve as the light absorber.

Fourth Embodiment

Figure 18:
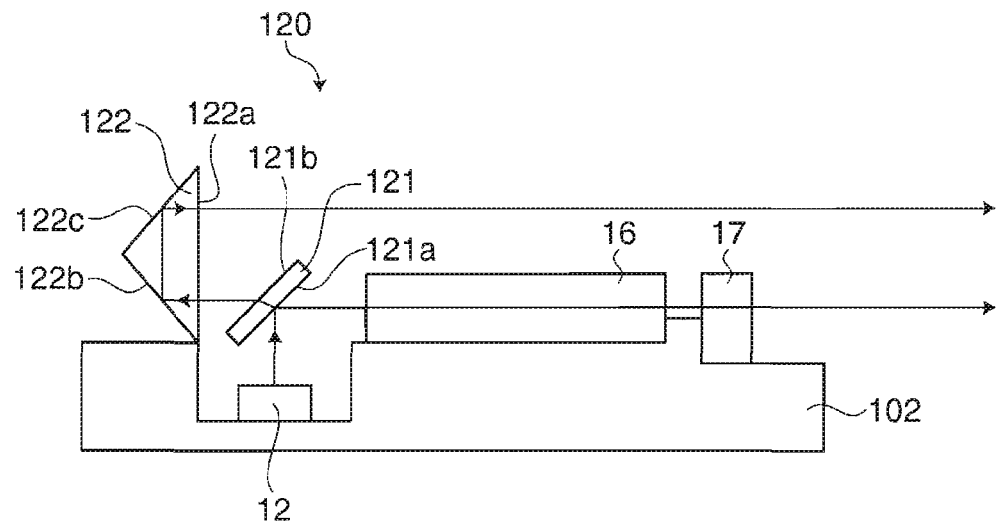
FIG. 18 is a diagram schematically illustrating a configuration of a light source device according to a fourth embodiment of the invention.

FIG. 18 shows a schematic configuration of a light source unit 120 used in an illuminating device according to a fourth embodiment of the invention. The light source unit 120 includes a dichroic mirror 121 and an optical prism 122. The same elements as the above-mentioned embodiments are denoted by the same reference numerals and repeated description thereof is omitted. The dichroic mirror 121 is disposed at a position on which a light from a semiconductor element 12 and a light from an SHG element 16 are incident. The dichroic mirror 121 serves as a wavelength separating section reflecting a light of a first wavelength and transmitting a light of a second wavelength. The dichroic mirror 121 is formed by applying a multi-layered dielectric film on a transparent member formed in a plate shape. The dichroic mirror 121 has a first face 121a facing the SHG element 16 and a second face 121b facing the optical prism 122. The multi-layered dielectric film not shown is formed on the first face 121a.

The optical prism 122 as an optical element is a rectangular prism having a sectional shape of a right-angled equilateral triangle. The optical prism 122 serves as a turnback section turning back the light from the dichroic mirror 121. The optical prism 122 has a first face 122a facing the dichroic mirror 121. A second face 122b of the optical prism 122 is a face adjacent to the first face 122a. A third face 122c of the optical prism 122 is a face between the first face 122a and the second face 122b. The third face 122c perpendicular to the second face 122b.

The light from the semiconductor element 12 is incident on the first face 121a of the dichroic mirror 121 at about 45 degrees. The laser light of the second wavelength taken out of the resonator structure by passing through the dichroic mirror 121 is refracted by the first face 121a and the second face 121b. The laser light of the second wavelength taken out of the dichroic mirror 121 from the second face 121b is incident on the first face 122a of the optical prism 122 at a right angle. The laser light of the second wavelength incident on the optical prism 122 through the first face 122a is incident on the second face 122b at about 45 degrees.

The laser light of the second wavelength incident on the second face 122b is totally reflected by the second face 122b and is then incident on the third face 122c at about 45 degrees. The laser light of the second wavelength incident on the third face 122c is totally reflected by the third face 122c, travels substantially parallel to the light incident on the second face 122b, and is incident on the first face 122a substantially at a right angle. The optical prism 122 emits the light from the first face 122a which is the same as the face on which the light from the dichroic mirror 121 is incident. The laser light of the second wavelength taken out of the optical prism 122 through the first face 122a travels substantially parallel to the light of the first wavelength reflected by the dichroic mirror 121.

In this embodiment, by providing the wavelength separating section independently of the turnback section, it is possible to construct the turnback section with a high degree of freedom. The optical prism 122 having a sectional shape of a right-angled triangle can be easily formed. By employing the optical prism 122 having a small-sized sectional shape, the first face 122a can be used for the incidence of the light on the optical prism 122 and the emission of the laser light from the optical prism 122. By enabling the incidence and emission of the light through the first face 122a of the optical prism 122, it is possible to reduce the gap between the laser light of the second wavelength passing through the external resonator 17 and the laser light of the second wavelength emitted from the optical prism 122. Accordingly, it is possible to easily embody a configuration suitable for a decrease in size by the use of the optical prism 122 with a simple shape. By using only the total reflection ill the optical prism 122, it is possible to turn back the laser light of the second wavelength with a simple configuration not using the reflecting film.

Fifth Embodiment

Figure 19:
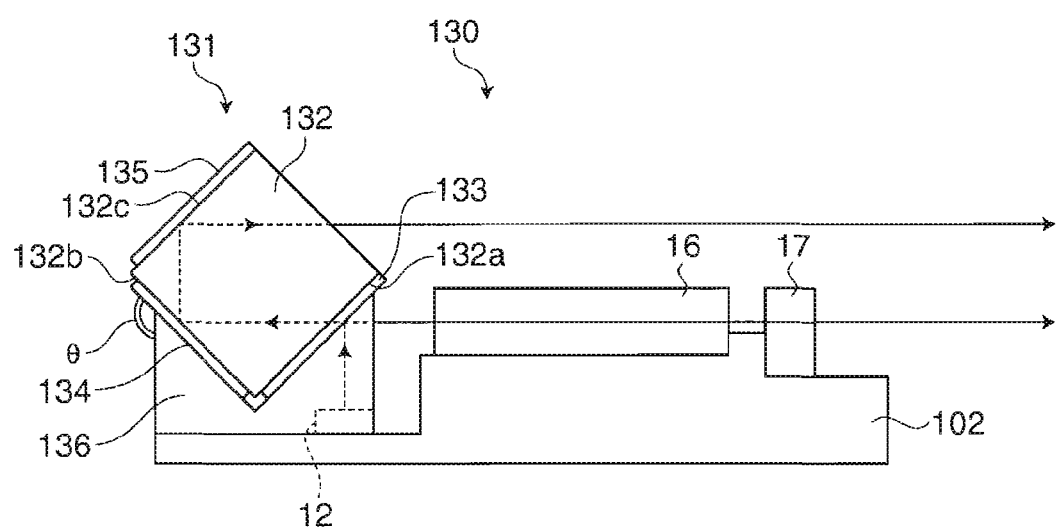
FIG. 19 is a diagram schematically illustrating a configuration of a light source device according to a fifth embodiment of the invention.

FIG. 19 is a diagram schematically illustrating a light source device 130 used in an illuminating device according to a fifth embodiment of the invention. The light source device 130 according to the fifth embodiment includes a turnback section 131 formed by combining three mirrors. The same elements as the above-mentioned embodiments are denoted by the same reference numerals and repeated description thereof is omitted.

Figure 20:
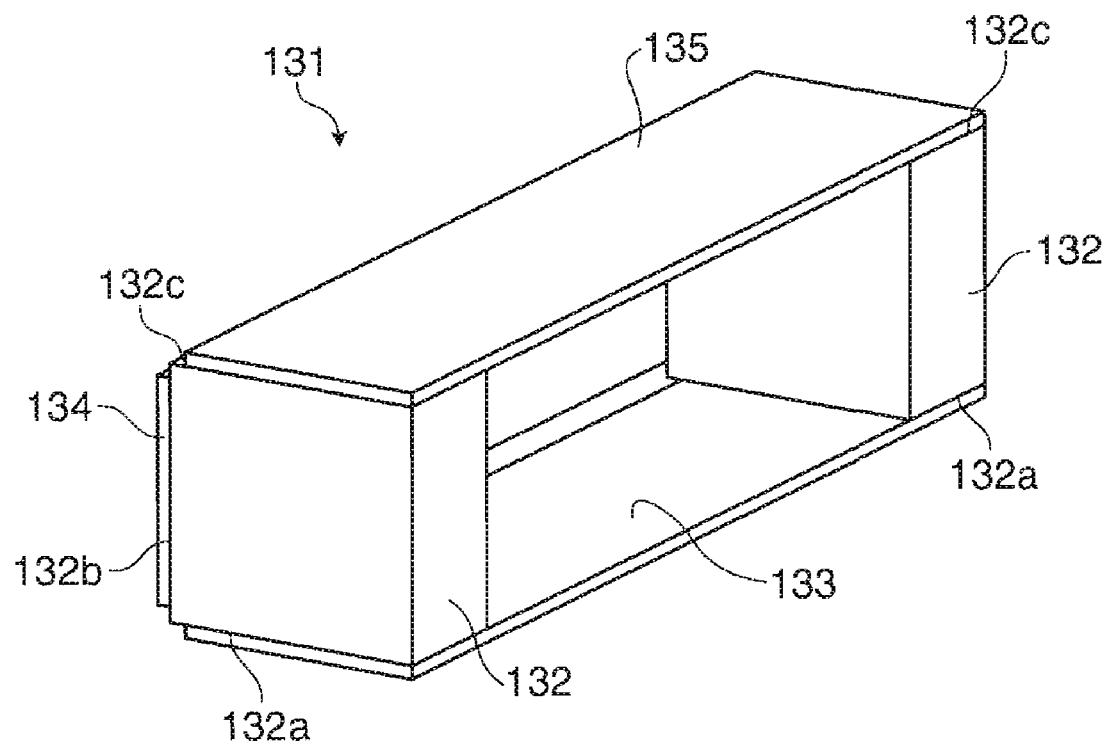
FIG. 20 is a perspective view illustrating a turnback section.

FIG. 20 is a perspective view of the turnback section 131. The turnback section 131 includes a first mirror 133, a second mirror 1345 and a third mirror 135. The first mirror 133 is a dichroic mirror serving as a wavelength separating section reflecting the light of the first wavelength and transmitting the light of the second wavelength. The first mirror 133 is formed by applying a multi-layered dielectric film on a transparent member having a plate shape. The second mirror 134 reflects the light of the second wavelength from the first mirror 133. The third mirror 135 reflects the light of the second wavelength from the second mirror 134. The second mirror 134 and the third mirror 135 are both formed by applying a reflecting film onto a transparent member having a plate shape. The first mirror 133, the second mirror 134, and the third mirror 135 all form substantially the same rectangular shape.

The turnback section 131 has two block structures 132 to which the first mirror 133, the second mirror 134, and the third mirror 135 are fixed. The block structures 132 serve as a fixing section fixing the first mirror 133, the second mirror 134, and the third mirror 135. The block structures 132 are disposed to correspond to the short sides of the first mirror 133, the second mirror 134, and the third mirror 135 having a rectangular shape. The block structures 132 have a rectangular hexahedron shape having a square section. Two block structures 132 are disposed so as for the square section to be substantially parallel to each other. The block structures 132 may be formed of any member, so long as it can accurately position the mirrors 133, 134, and 135.

A first face 132a and a third face 132c of the block structure 132 are parallel to each other. A second face 132b is a face between the first face 132a and the third face 132c. The first mirror 133 is fixed to the first face 132a of the block structure 132. The multi-layered dielectric film disposed on the first mirror 133 is formed on the surface of the first mirror 133 opposite to the surface fixed to the block structure 132. The second mirror 134 is fixed to the second face 132b of the block structure 132. The reflecting film formed on the second mirror 134 is formed on the surface of the second mirror fixed to the block structure 132. The third mirror 135 is formed on the third face 132c of the block structure 132. The reflecting film formed on the third mirror 135 is disposed on the surface of the third mirror 135 fixed to the block structure 132.

The first mirror 133 and the third mirror 135 are positioned to be parallel to each other by the block structures 132. The second mirror 134 is positioned to be perpendicular to the first mirror 133 and the third mirror 135 by the block structures 132. The turnback section 131 forms an integrated structure by fixing the first mirror 133, the second mirror 134, and the third mirror 135 to the block structures 132.

Referring to FIG. 19 again, a support portion 136 supports the turnback section 131 on a substrate 102. The semiconductor element 12 is mounted on the support portion 136. The turnback section 131 is disposed using the support portion 136 so that the light from the semiconductor element 12 forms substantially an angle of about 45 degrees about the first face 132a. The angle θ between the face of the support portion 136 perpendicular to the substrate 102 and the second mirror 134 is about 135 degrees.

The light of the first wavelength incident on the first mirror 133 from the semiconductor element 12 and reflected by the first mirror 133 is bent in optical path by about 90 degrees by the first mirror 133 and travels to the SHG element 16. The light of the first wavelength incident on the first mirror 133 from the SHG element 16 and reflected by the first mirror 133 is bent in optical path by about 90 degrees by the first mirror 133 and travels to the semiconductor element 12.

The laser light of the second wavelength taken out of the resonator structure by passing through the first mirror 133 is incident on the second mirror 134. The laser light of the second wavelength forms an angle of about 45 degrees about the second mirror 134. The laser light of the second wavelength bent in optical path by about 90 degrees by means of the reflection of the second mirror 134 is incident on the third mirror 135. The laser light forms an angle of about 45 degrees about the third mirror 135. The laser light of the second wavelength bent in optical path by about 90 degrees by means of the reflection of the third mirror 135 travels substantially parallel to the light of the first wavelength reflected by the first mirror 133.

Figure 21:
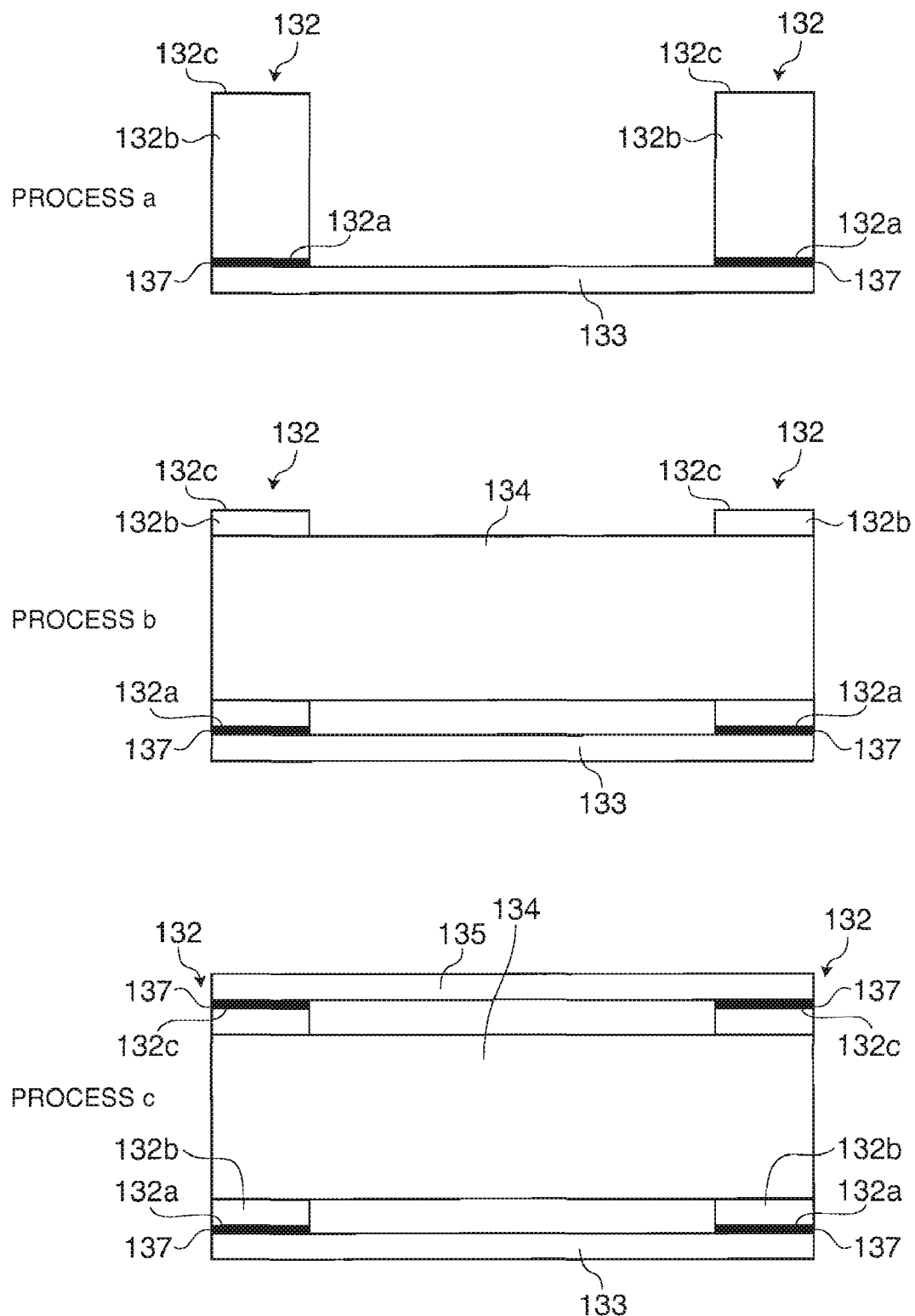
FIG. 21 is a diagram illustrating a process of manufacturing the turnback section.

FIG. 21 shows a procedure of manufacturing the turnback section 131. In process a, the first mirror 133 is fixed to the first face 132a of the block structures 132. An adhesive member is used to fix the first face 132a and the first mirror 133 to each other. An adhesive layer 137 is formed between the first face 132a and the first mirror 133. In process b, the second mirror 134 is fixed to the second face 132b of the block structures 132. An adhesive member is used to fix the second face 132b and the second mirror 134 to each other. A adhesive layer 137 is formed between the second face 132b and the second mirror 134.

In process c, the third mirror 135 is fixed to the third face 132c of the block structures 132. An adhesive member is used to fix the third face 132c and the third mirror 135 to each other. An adhesive layer 137 is formed between the third face 132c and the third mirror 135. In this way, the block structures 132 can be fixed to the first mirror 133, the second mirror 134, and the third mirror 135.

It is possible to simplify the configuration of the turnback section 131 including the first mirror 133, the second mirror 134, and the third mirror 135 and to reduce the manufacturing cost therefor. Accordingly, it is possible to obtain a configuration for turning back the laser light of the second wavelength with a low-cost and simple configuration. The block structures 132 may be disposed at any position so long as it is a position other than the position on which the laser light of the second wavelength passing through the first mirror 133 among the mirrors 133, 134, and 135.

Figure 22:
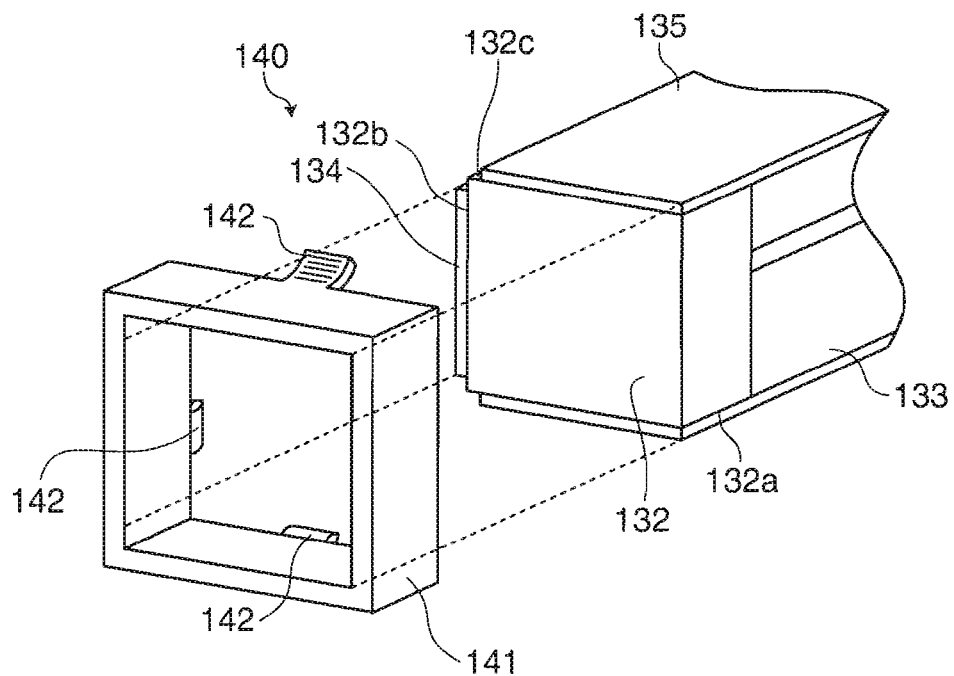
FIG. 22 is a diagram illustrating a configuration of a turnback section according no a first modified example of the fifth embodiment of the invention.

FIG. 22 is a diagram illustrating a configuration of a turnback section 140 according to a first modified example of the fifth embodiment. In this modified example, the mirrors 133, 134, and 135 are fixed to the block structures 132 by the use of three leaf spring portions 142 instead of the adhesive layer 137. The leaf spring portions 142 have a plate-shaped elastic structure bringing the first mirror 133, the second mirror 134, and the third mirror 135 into contact with the block structures 132. The leaf spring portions 142 are disposed in a frame member 141. The frame member 141 has a frame shape into which portions of the first mirror 133, the second mirror 134, and the third mirror 135 coming in contact with the block structures 132 are inserted. The frame member 141 and the leaf spring portions 142 are formed of, for example, a metal member.

The leaf spring portions 142 are disposed in the frame member 141 at a portion coming in contact with the first mirror 133, a portion coming in contact with the second mirror 134, and a portion coming in contact with the third mirror 135. The leaf spring portions 142 are configured to warp to the outside of the frame member 141 and brings the first mirror 133, the second mirror 134, and the third mirror 135 into contact with the block structures 132 by the use of a restoring force toward the inside of the frame member 141. In this modified example, the block structures 132 can be also fixed to the first mirror 133, the second mirror 1344, and the third mirror 135.

Figure 23:
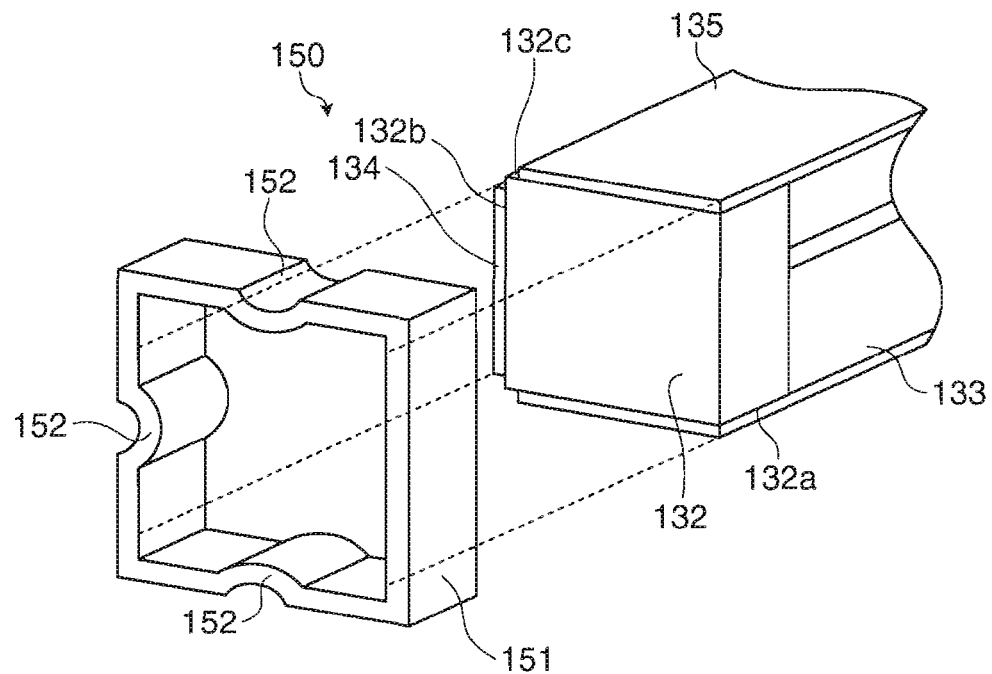
FIG. 23 is a diagram illustrating a configuration of a turnback section according to a second modified example of the fifth embodiment.

FIG. 23 is a diagram illustrating a configuration of a turnback section 150 according to a second modified example of the fifth embodiment. In this modified example, the mirrors 133, 134, and 135 are fixed to the block structures 132 by the use of a frame member 151 in which three leaf spring members are combined. The frame member 151 is an elastic structure for bringing the first mirror 133, the second mirror 134, and the third mirror 135 into contact with the block structures 132. The frame member 151 is formed by combining three leaf spring menders and one plate-shaped member into a frame shape.

Contact portions 152 being convex toward the inside of the frame member 151 are formed at the centers of the leaf spring members. The contact portions 152 are disposed in a portion coming in contact with the first mirror 133, a portion coming in contact with the second mirror 134, and a portion coming in contact with the third mirror 135, of the frame member 151. The portions of the first mirror 133, the second mirror 134, and the third mirror 135 coming in contact with the block structures 132 can be inserted into the frame member 151. The frame member 151 is formed of, for example, a metal member.

The leaf spring members are configured to warp by directing the contact portions 152 to the outside of the frame member 151 and to bring the first mirror 133, the second mirror 134, and the third mirror 135 into contact with the block structure 132 by the use of the restoring force in the direction in which the contact portions 152 is directed to the inside of the frame member 151. In this modified example, it is also possible to fix the first mirror 133, the second mirror 134, and the third mirror 135 to the block structures 132.

The shape of the elastic structure used for the turnback section is not limited to those described in this embodiment, but may be properly modified. At least one of the second mirror 134 and the third mirror 135 of the turnback section according to this embodiment may be a dichroic mirror. When the dichroic mirror is used, the turnback section can separate the light of the first wavelength, similarly to the light source device 110 according to the third embodiment. By properly modifying the light source device 130 according to this embodiment, a converging light or a diverging light may be allowed to travel to the emission destination.

Sixth Embodiment

Figure 24:
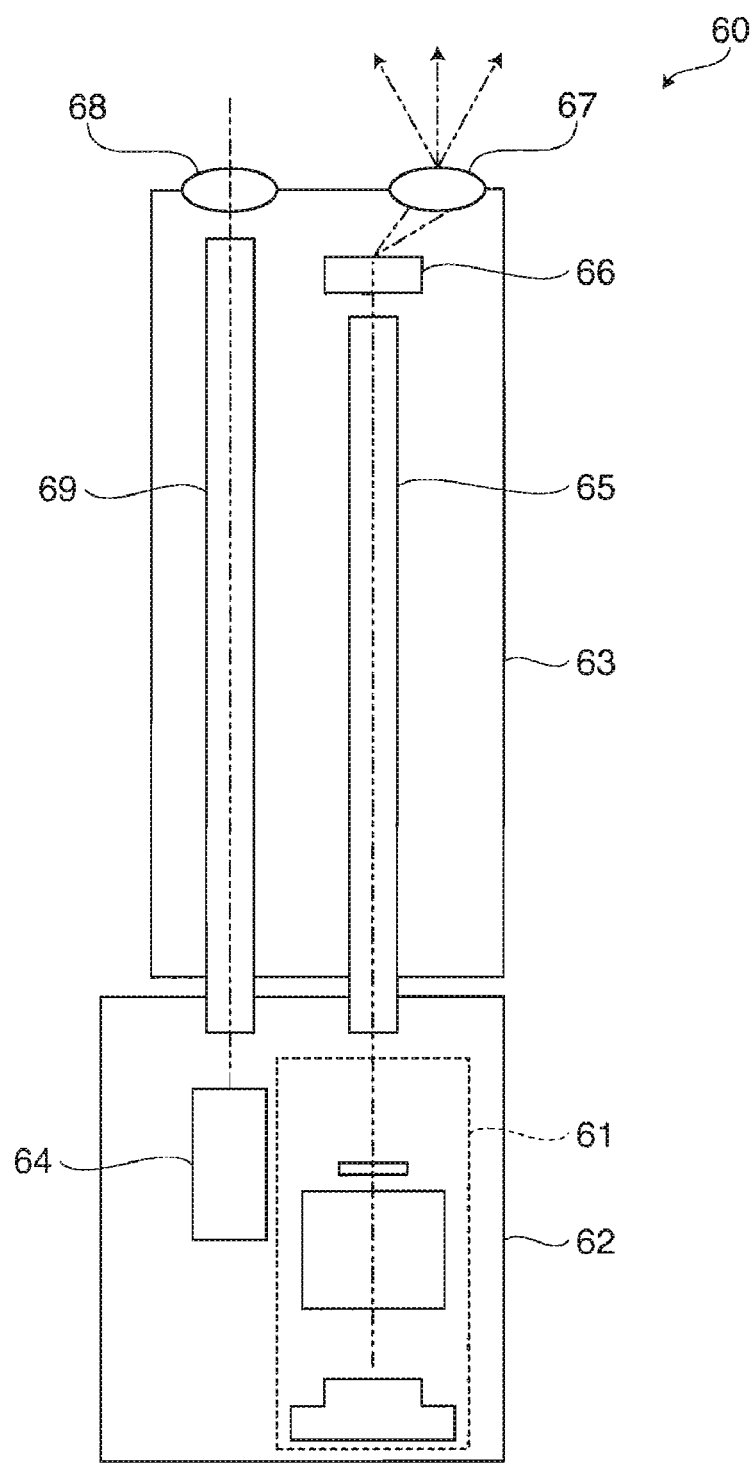
FIG. 24 is a diagram schematically illustrating a monitoring apparatus according to a sixth embodiment of the invention.

FIG. 24 is a diagram schematically illustrating a monitoring apparatus 60 according to a sixth embodiment of the invention. The monitoring apparatus 60 includes an apparatus body 62 and a light transmitting section 63. The apparatus body 62 includes a light source device 61 having the same configuration as the light source device 11 according to the first embodiment. The same elements as the first embodiment are denoted by the same reference numerals and repeated description thereof is omitted.

The light transmitting section 63 includes two light guides 65 and 69. A diffusion lens 67 and a focusing lens 68 are disposed at one end of the light transmitting section 63 close to a subject (not shown). The first light guide 65 transmits a light from the light source device 61 to the subject. The diffusion element 66 and the diffusion lens 67 are disposed on an emission side of the first light guide 65. The diffusion element 66 shapes and enlarges an illuminating area and uniformizes the intensity distribution of the laser light. The diffusion lens 67 diffuses the light from the diffusion element 66 to the subject. The elements in the optical path from the light source device 61 to the diffusion lens 67 form the illuminating device illuminating the subject.

The second light guide 69 transmits the light from the subject to a camera 64. The focusing lens 68 is disposed on an incidence side of the second light guide 69. The focusing lens 68 focuses the light from the subject on the incidence face of the second light guide 69. The light from the subject is incident on the second light guide 69 through the focusing lens 68, propagates the inside of the second light guide 69, and then is incident on the camera 64.

Bundles of plural optical fibers can be used as the first light guide 65 and the second light guide 69. The laser light can be transmitted to a distal end through the optical fibers. The camera 64 is disposed in the apparatus body 62. The camera 64 is an image pickup section picking up an image of a subject illuminated by the elements in the optical path from the light source device 61 to the diffusion lens 67. By allowing the light from the second light guide 69 to be incident on the camera 64, it is possible to pick up an image of the subject by the use of the camera 64.

By employing an illuminating device having the same light source device 61 as the first embodiment, it is possible to obtain high wavelength conversion efficiency with a simple and small configuration. Accordingly, it is possible to monitor a bright image with a simple and small configuration. The light source device 61 may have the same configuration as any light source device described in the above-mentioned embodiments.

Seventh Embodiment

Figure 25:
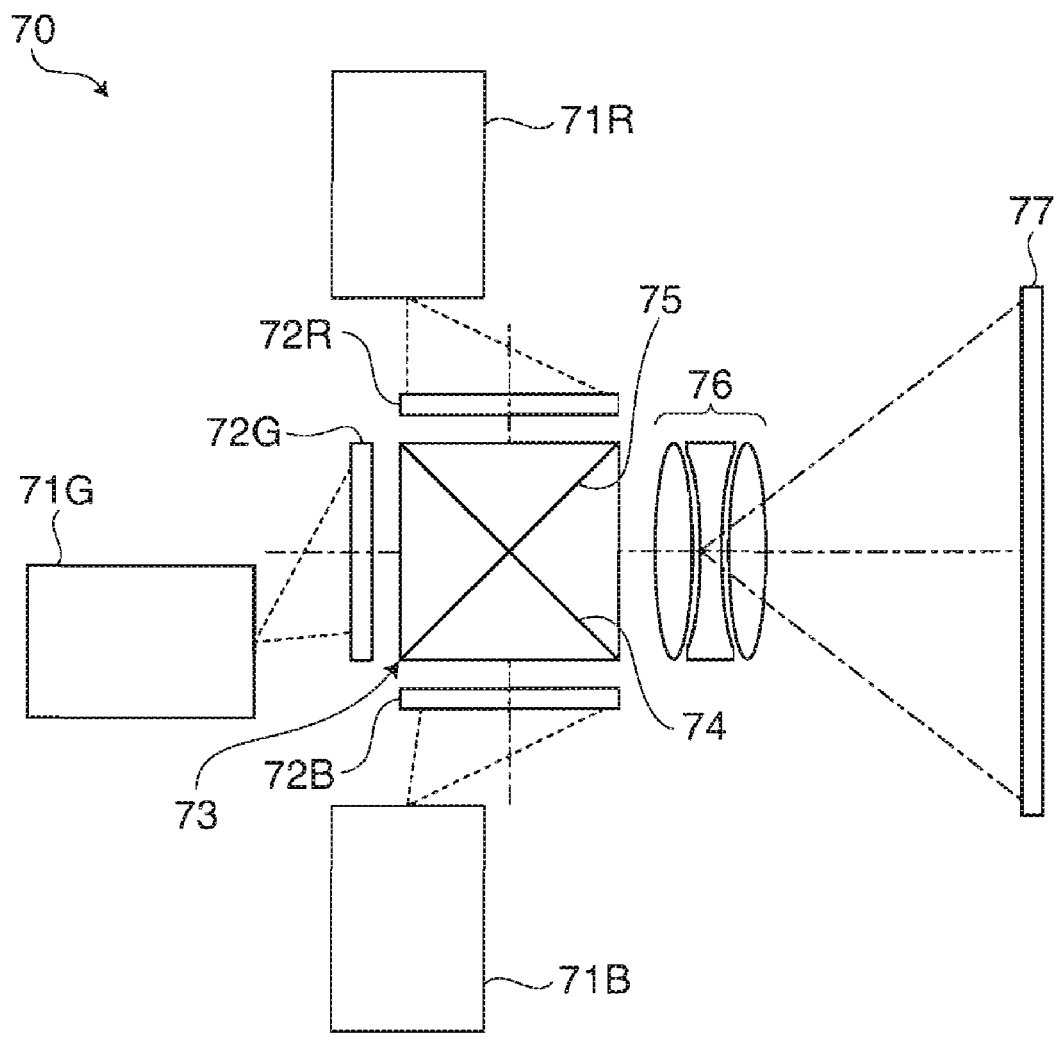
FIG. 25 is a diagram schematically illustrating a projector according to a seventh embodiment of the invention.

FIG. 25 is a diagram schematically illustrating a projector 70 according to a seventh embodiment of the invention. The projector 70 is a front projection type projector which can enable enjoy an image by projecting lights to a screen 77 and observing the lights reflected from the screen 77. The projector 70 includes a red color (R) illuminating device 71R, a green color (G) illuminating device 71G, and a blue color (B) illuminating device 71B. The color illuminating devices 71R, 71G, and 71B have the same configuration as the illuminating device 10 according to the first embodiment. The projector 70 displays an image by the use of the color illuminating device 71R, 71G, and 71B.

The R color illuminating device 71R is an illuminating device supplying an R light. An R color spatial light modulator 72R is an illuminating object of the R color illuminating device 71R. The R color spatial light modulator 72R is a spatial light modulator modulating the R light from the R color illuminating device 71R on the basis of an image signal and is a transmissive liquid crystal display device. For example, a high temperature polysilicon TFT (HTPS) liquid crystal panel can be used as the transmissive liquid crystal display device. The R light modulated by the R color spatial light modulator 72R is incident on a cross dichroic prism 73 as a color combining optical system.

The G color illuminating device 71G is an illuminating device supplying a G light. A G color spatial light modulator 72G is a spatial light modulator modulating the G light from the G color illuminating device 71G on the basis of the image signal and is a transmissive liquid crystal display device. The G light modulated by the C color spatial light modulator 72G is incident on the cross dichroic prism 73 from a side different from that of the R light.

The B color illuminating device 71B is an illuminating device supplying a B light. A B color spatial light modulator 72B is a spatial light modulator modulating the B light from the B color illuminating device 71B on the basis of the image signal and is a transmissive liquid crystal display device. The B light modulated by the B color spatial light modulator 72B is incident on the cross dichroic prism 73 from a side different from those of the R light and the G light.

The cross dichroic prism 73 includes two dichroic films 74 and 75 disposed to be substantially perpendicular to each other. The first dichroic film 74 reflects the R light and transmits the G light and the B light. The second dichroic film 75 reflects the B light and transmits the R light and the G light. The cross dichroic prism 73 synthesizes the R light, the C light and the B light incident from different sides and emits the synthesized light toward a projection lens 76. The projection lens 76 projects the light synthesized by the cross dichroic prism 73 toward the screen 77.

By employing the illuminating device according to the first embodiment, it is possible to emit a light at high efficiency with a simple and small configuration. Accordingly, it is possible to display a bright image with a simple and small configuration. The color illuminating devices 71R, 71G, and 71B may have the same configuration as any one described above. The projector is not limited to a projector 70 using a transmissive liquid crystal display device as a spatial light modulator. A reflective liquid crystal on silicon (LCOS) device, a digital micro mirror device (DMD), or a grating light valve (GLV) may be used as the spatial light modulator. The projector 70 is not limited to the configuration including the spatial light modulators by colors.

The projector 70 may have a configuration modulating two or three or more color lights by the use of a single spatial light modulator. The projector may be a so-called a rear projector which can allow a user to observe an image by supplying a light to one surface of a screen and observing a light emitted from the other surface of the screen. The light source device according to the invention is riot limited to a case where it is used in the projector, the monitoring apparatus, and the illuminating device. For example, the light source device may be used in an exposure apparatus performing an exposure process using a laser light.

As described above, the light source unit according to the invention can be suitably used in an illuminating device for a projector or a monitor apparatus.

The entire disclosure of Japanese Patent Application Nos. 2006-353825, filed Dec. 28, 2006 and 2007-265269, filed Oct. 11, 2007 are incorporated by reference herein.

What is claimed is:

1. A light source device, comprising:
   a light source unit emitting light of a first wavelength;
   a wavelength converting element converting the light of the first wavelength into light of a second wavelength different from the first wavelength;
   an external resonator transmitting the light of the second wavelength emitted from the wavelength converting element to travel to a emission destination and reflecting the light of the first wavelength to resonate between the light source unit and the external resonator;
   a wavelength separating section transmitting the light converted from the first wavelength to the second wavelength in the course of traveling from the external resonator to the light source unit and reflecting the light of the first wavelength to separate the light of the first wavelength and the light of the second wavelength from each other; and
   a turnback section turning back the light of the second wavelength separated by the wavelength separating section toward the emission destination,
   wherein the wavelength separating section reflects the light of the first wavelength from the light source unit to travel toward the wavelength converting element.

2. The light source device according to claim 1, wherein the turnback section has an integrated structure.

3. The light source device according to claim 1, wherein the turnback section allows the light of the second wavelength traveling from the turnback section to the emission destination and the light of the second wavelength passing through the external resonator to converge to the emission destination.

4. The light source device according to claim 1, wherein the turnback section allows the light of the second wavelength traveling from the turnback section to the emission destination and the light of the second wavelength passing through the external resonator to diverge to the emission destination.

5. A projector comprising:
   the light source device according to claim 1; and
   a spatial light modulator modulating a light from the light source device on the basis of an image signal.

6. The light source device according to claim 1, wherein the turnback section includes an optical element totally reflecting the light of the second wavelength in a boundary surface thereof.

7. The light source device according to claim 6, further comprising a reflecting section that is disposed in the optical element and that reflects the light of the second wavelength.

8. The light source device according to claim 6, wherein the optical element has a first face provided with the wavelength separating section and a second face reflecting the light of the second wavelength passing through the first face, and
   wherein the first face and the second face are substantially perpendicular to each other.

9. The light source device according to claim 1, wherein the wavelength separating section serves as a first wavelength separating section reflecting a part of the light of the first wavelength from the external resonator and transmitting a part of the light of the first wavelength and tithe light of the second wavelengths and
   wherein the turnback section includes a second wavelength separating section separating the light of the first wavelength from the first wavelength separating section and the light of the second wavelength from each other.

10. The light source device according to claim 9, further comprising a light detector detecting the light of the first wavelength separated by the second wavelength separating section.

11. The light source device according to claim 9, further comprising a light absorber absorbing the light of the first wavelength separated by the second wavelength separating section.

12. The light source device according to claim wherein the turnback section allows the light of the second wavelength traveling from the turnback section toward the emission destination to travel substantially parallel to the light of the first wavelength from the light source unit reflected by the wavelength separating section.

13. The light source device according to claim 12, wherein the turnback section emits a light from the same face on which the light is incident from the wavelength separating section.

14. The light source device according to claim 12, wherein the optical element has a sectional shape of a right-angled triangle.

15. The light source device according to claim 12, wherein the optical element has a sectional shape of a square.

16. The light source device according to claim 15, wherein the optical element has a cube shape.

17. The light source device according to claim 1, wherein the turnback section includes a first mirror serving as the wavelength separating section, a second mirror reflecting the light of the second wavelength from the first mirror, and a third mirror reflecting the light of the second wavelength from the second mirror.

18. The light source device according to claim 17, further comprising a fixing section fixing the first mirror, the second mirror, and the third mirror.

19. The light source device according to claim 18, further comprising an adhesive layer adhering at least one of the first mirror, the second mirror, and the third mirror to the fixing section.

20. The light source device according to claim 18 further comprising an elastic structure bringing at least one of the first mirror, the second mirror, and the third mirror into contact with the fixing section.

* * * * *